(12) United States Patent
Cohen et al.

(10) Patent No.: US 11,734,533 B1
(45) Date of Patent: Aug. 22, 2023

(54) SECURE SCANNING OF MACHINE-READABLE CODES

(71) Applicant: the dtx company, New York, NY (US)

(72) Inventors: Neil Wayne Cohen, Oakton, VA (US); Andrew Duplessie, New York, NY (US)

(73) Assignee: the dtx company, New York, NY (US)

(*) Notice: Subject to any disclaimer, the term of this patent is extended or adjusted under 35 U.S.C. 154(b) by 0 days.

(21) Appl. No.: 17/835,214

(22) Filed: Jun. 8, 2022

(51) Int. Cl.
*G06K 7/14* (2006.01)
*H04L 9/32* (2006.01)

(52) U.S. Cl.
CPC .......... *G06K 7/1417* (2013.01); *H04L 9/3247* (2013.01)

(58) Field of Classification Search
CPC .............................. G06K 7/141; H04L 9/3247
USPC ................... 235/454, 462.01–462.49
See application file for complete search history.

(56) References Cited

U.S. PATENT DOCUMENTS

| | | |
|---|---|---|
| 7,467,356 B2 | 12/2008 | Gettman et al. |
| 7,504,949 B1 | 3/2009 | Rouaix et al. |
| D697,529 S | 1/2014 | Judge Cornish |
| D702,723 S | 4/2014 | Abratowski et al. |
| D723,104 S | 2/2015 | Cho et al. |
| 9,201,975 B2 | 12/2015 | Hall |
| D769,296 S | 10/2016 | Grecia |
| 9,704,081 B2 | 7/2017 | Tanaka et al. |
| 9,936,249 B1 | 4/2018 | Nelson et al. |
| D826,955 S | 8/2018 | Grecia |
| D857,054 S | 8/2019 | Grecia |
| 10,375,060 B1 | 8/2019 | Graves et al. |
| D860,256 S | 9/2019 | Stephen |
| 10,460,138 B2 | 10/2019 | Barnum |
| 10,803,432 B1 | 10/2020 | Miles |
| D905,743 S | 12/2020 | Jewitt |
| 10,963,868 B1 | 3/2021 | McCauley et al. |
| D918,936 S | 5/2021 | Walsh et al. |
| 11,010,650 B1 | 5/2021 | Devlin et al. |
| 11,106,753 B1 | 8/2021 | Fowler et al. |
| 11,120,095 B2 | 9/2021 | Askarian et al. |
| D936,699 S | 11/2021 | McDonald |
| 11,182,768 B2 | 11/2021 | Fowler et al. |
| D939,570 S | 12/2021 | Dye et al. |

(Continued)

OTHER PUBLICATIONS

Inderscience Enterprises Ltd., Wickramasinghe et al., "A Mathematical Model for Computational Aesthetics," pp. 310-324, 2010, Int. J. Computational Vision and Robotics, vol. 1, No. 3.

(Continued)

*Primary Examiner* — Jamara A Franklin
(74) *Attorney, Agent, or Firm* — Weiss & Arons

(57) ABSTRACT

Apparatus and methods provide an end-to-end system for claiming and sharing non-fungible tokens ("NFTs"). A machine-readable code ("MRC") may be scanned and validated. Validating the MRC may ensure that instructions encoded in the MRC do not include malware. Validating the MRC may include validating a digital signature encoded in the scanned MRC. Validating the MRC may include locating a record stored on a distributed ledger that corresponds to the scanned MRC. After validating the instructions, processing the encoded instructions may trigger distribution of an NFT to the scanning device. The distributed NFT may be visualized on a webpage or used to gain access to a restricted venue.

12 Claims, 20 Drawing Sheets

(56) References Cited

U.S. PATENT DOCUMENTS

| | | |
|---|---|---|
| 11,194,981 B2 | 12/2021 | Filter et al. |
| 11,205,105 B1 | 12/2021 | Devlin et al. |
| 11,206,432 B1 | 12/2021 | Fowler et al. |
| 11,263,282 B2 | 3/2022 | Fowler et al. |
| 11,334,779 B1 | 5/2022 | Schwarzberg |
| 11,347,823 B2 | 5/2022 | Askarian et al. |
| 2002/0032791 A1 | 3/2002 | Isherwood et al. |
| 2002/0139839 A1 | 10/2002 | Catan |
| 2004/0123223 A1 | 6/2004 | Halford |
| 2004/0246529 A1 | 12/2004 | Pruden et al. |
| 2006/0196950 A1 | 9/2006 | Kiliccote |
| 2006/0215931 A1 | 9/2006 | Shimomukai |
| 2007/0035327 A1 | 2/2007 | Baeckler et al. |
| 2007/0286455 A1 | 12/2007 | Bradley |
| 2009/0094175 A1 | 4/2009 | Proves et al. |
| 2009/0240816 A1 | 9/2009 | Philyaw et al. |
| 2010/0128921 A1 | 5/2010 | Alattar et al. |
| 2011/0290882 A1 | 12/2011 | Gu et al. |
| 2012/0016678 A1 | 1/2012 | Gruber et al. |
| 2012/0206648 A1 | 8/2012 | Casagrande et al. |
| 2012/0256732 A1 | 10/2012 | McAllister |
| 2012/0278465 A1 | 11/2012 | Johnson |
| 2013/0112760 A1 | 5/2013 | Schory et al. |
| 2013/0197992 A1 | 8/2013 | Bao |
| 2013/0215475 A1 | 8/2013 | Noguchi |
| 2013/0228624 A1 | 9/2013 | Byrd et al. |
| 2013/0297430 A1 | 11/2013 | Soergel |
| 2014/0001253 A1 | 1/2014 | Smith |
| 2014/0095461 A1 | 4/2014 | Burt |
| 2015/0006702 A1 | 1/2015 | Lakes et al. |
| 2015/0014417 A1 | 1/2015 | Finlow-Bates et al. |
| 2015/0048169 A1 | 2/2015 | Doberschutz |
| 2015/0099946 A1 | 4/2015 | Sahin |
| 2015/0262221 A1 | 9/2015 | Nakano et al. |
| 2015/0324678 A1 | 11/2015 | Simske et al. |
| 2016/0063129 A1 | 3/2016 | Lim et al. |
| 2016/0148083 A1 | 5/2016 | Osborne et al. |
| 2016/0162767 A1 | 6/2016 | Ito et al. |
| 2016/0189016 A1 | 6/2016 | Windmueller et al. |
| 2016/0247423 A1 | 8/2016 | Hohl et al. |
| 2016/0364825 A1 | 12/2016 | Pan |
| 2017/0264608 A1 | 9/2017 | Moore et al. |
| 2017/0300854 A1 | 10/2017 | Harcar et al. |
| 2018/0365330 A1 | 12/2018 | Lin et al. |
| 2019/0089757 A1 | 3/2019 | Sorensen et al. |
| 2019/0138721 A1 | 5/2019 | Wojnowicz et al. |
| 2019/0221293 A1 | 7/2019 | Zhang |
| 2019/0234975 A1 | 8/2019 | Pothini et al. |
| 2019/0258814 A1 | 8/2019 | Heeter |
| 2019/0281030 A1 | 9/2019 | Isaacson et al. |
| 2019/0281124 A1 | 9/2019 | Lim et al. |
| 2020/0356080 A1 | 11/2020 | Principato |
| 2020/0356083 A1 | 11/2020 | Principato |
| 2020/0356741 A1 | 11/2020 | Principato |
| 2020/0394699 A1 | 12/2020 | Mueller |
| 2021/0042730 A1 | 2/2021 | Lee |
| 2021/0056541 A1* | 2/2021 | Kim ................ G06Q 20/326 |
| 2021/0217006 A1* | 7/2021 | Ragavan ............ G06F 3/1238 |
| 2021/0271803 A1 | 9/2021 | Seymour et al. |
| 2021/0287202 A1 | 9/2021 | Fowler et al. |
| 2021/0334490 A1 | 10/2021 | Luk et al. |
| 2021/0357715 A1 | 11/2021 | Schimke et al. |
| 2021/0377263 A1* | 12/2021 | Law ..................... G06F 21/32 |
| 2022/0215190 A1 | 7/2022 | Cohen et al. |
| 2022/0253811 A1 | 8/2022 | Fowler et al. |
| 2022/0374664 A1 | 11/2022 | Zhou et al. |

OTHER PUBLICATIONS

Elsevier, Maity et al., "A Computational Model to Predict Aesthetic Quality of Text Elements of GUI," pp. 152-159, 2016, Procedia Computer Science 84 (2016), www.sciencedirect.com.
AI Shack, Utkarsh Sinha, "Scanning QR Codes," 2010, https://aishack.in/tutorials/scanning-qr-codes-1/.
AIA Vision Online, "The Most Common Causes of Unreadable Barcodes," Apr. 15, 2015, https://www.visiononline.org/vision-resources-details.cfm?content_id=5404.
Workwithcolor.com, "Color Properties/Terminology," Retrieved on Jun. 8, 2020, http://www.workwithcolor.com/color-properties-definitions-0101.htm.
The Eurographics Association, Florian Hoenig, "Defining Computational Aesthetics," 2005, Computational Aesthetics in Graphics, Visualization and Imaging (2005), www.diglib.eg.org.
Datagenetics, "Wounded QR Codes," Nov. 2013, http://datagenetics.com/blog/november12013/index.html.
QR Code Monkey, "6 Reasons Why Your QR Code is Not Working," Retrieved on Jun. 9, 2020, https://www.qrcode-monkey.com/6-reasons-why-your-qr-code-is-not-working.
TechSpot, Inc., Mark Turner, "QR Codes Explained," Sep. 3, 2018, https://www.techspot.com/guides/1676-qr-code-explained/.
Medium.com, Sciforce, "Computational Aesthetics: Shall We Let Computers Measure Beauty?," Jun. 12, 2020, https://medium.com/sciforce/computational-aesthetics-shall-we-let-computers-measure-beauty-db2205989fb.
Thonky.com, "Module Placement in Matrix," Retrieved on Jun. 8, 2020, https://www.thonky.com/qr-code-tutorial/module-placement-matrix.
Keyence Corporation of America, "What is a QR Code," Retrieved on Jun. 8, 2020, https://www.keyence.com/ss/products/auto_id/barcode_lecture/basic_2d/qr/.
Wikimedia Foundation, Inc., "QR Code," Retrieved on Jun. 3, 2020, https://en.wikipedia.org/wiki/QR_code.
Wikimedia Foundation, Inc., Walter Tuveli, "QR Code—Structure," 2012, https://en.wikipedia.org/wik/QR_code#/media/File:QRCode-2-Structure.png.
Wikimedia Foundation, Inc., "ShotCode,"https://en.wikipedia.org/wiki/ShotCode#searchInput, Retrieved on Aug. 6, 2021.
www.medium.com, Punit Pathak, "ETL-Understanding It and Effectively Using It," https://medium.com/hashmapinc/etl-understanding-it-and-effectively-using-it-f827a5b3e54d, Jan. 7, 2019.
Strathmore University (Nairobi, Kenya), Kizi Dimira Othuon, "Improving Customer Experience Using an Android Barcode Reader Application," https://su-plus.strathmore.edu/bitstream/handle/11071/5978/Improving%20customer%20shopping%20experience%20using%20an%20Android%20barcode%20reader%20application.pdf?sequence=1&isAllowed=y, Apr. 2018.
Horrigan, Aidan. "Mr. WHS 2020." westboroughtv.org. Jun. 12, 2020. Retrieved Jun. 2, 2022 online at URL: https://westboroughtv.org/mr-whs-2020-2/, (Year: 2020).
Wa, Izakaya. "QR codes for the dinner menu and lunch menu at Memorial!" facebook.com. Jul. 24, 2020. Retrieved Jun. 2, 2022 online at URL: https://m.facebook.com/196433773873837/posts/qr-codes-for-the-dinner-menu-and-lunch-menu-at-memorial.1730306280486571, (Year: 2020).
"StockX TV Spot, 'Flowcode: Never Sold Out.'" ispot.tv. Published Mar. 27, 2020. Retrieved Jun. 2, 2022 online at URL: https://www.ispot.tv/ad/nVly/stockx-flowcode-never-sold-out, (Year: 2020).
"#FitForTheFrontline Challenge Unites Nation's Top Medical Centers to Support Frontline Healthcare Workers." nyp.org. May 28, 2020. Retrieved Jun. 2, 2022 online at URL: https://www.nyp.org/news/fit-for-the-frontline-challenge, (Year: 2020).
"Mastering Bitcoin: Chapter 4. Keys, Addresses, Wallets," O'Reilly Media, Inc., https://www.oreilly.com/library/view/mastering-bitcoin/9781491902639/ch04.html, Retrieved on Mar. 30, 2022.
Ameer Rosie, "Basic Primer: Blockchain Consensus Protocol," blockgeeks.com, Retrieved on Apr. 10, 2022.
"Common DApp Risks and How to Avoid Them," Saint Bits LLC, https://www.bitcoin.com/get-started/common-dapp-risks-and-how-to-avoid-them/, Mar. 30, 2022.
Martin Florian et al., "Erasing Data from Blockchain Nodes," https://arxiv.org/pdf/1904.08901.pdf Apr. 18, 2019.
Shafin Rizvi, "How to Avoid Falling Victim to Crypto Phishing Scams," https://tustwallet.com/blog/how-to-avoid-falling-victm-to-phishing. Trust Wallet, May 31, 2021.
Alex Lielacher, "How to Safely Use DApps—A Beginners Guide," https://trustwallet.com/blog/how-to-safely-use-dapps-beginners-guide, Trust Wallet, Oct. 27, 2021.

(56) References Cited

OTHER PUBLICATIONS

"How to Use Wallet Connect," https://academy.binance.com/en/articles/how-to-use-walletconnect, Binance Academy, Jun. 30, 2021.
"Internet Crime Complaint Center (IC3): Cybercriminals Tampering with QR Codes to Steal Victims Funds," Alert No. I-011822-PSA, https://www.ic3.gov/Media/Y2022/PSA220118, Federal Bureau of Investigation, Jan. 18, 2022.
Samuel Gilbert, "What is POAP?" https://help.poap.xyz/en/articles/5820491-what-is-poap, Retrieved on Apr. 29, 2022.
"Security Tip (ST04-018) Understanding Digital Signatures," https://www.cisa.gov/uscert/ncas/tips/ST04-018, U.S. Cybersecurity and Infrastructure Security Agency, Dec. 17, 2009.
"What is a Web3 Wallet—Understanding and Using Non-Custodial Wallets," https://web3.hashnode.com/what-is-a-web3-wallet, Hashnode Web3, Jan. 6, 2022.
"What is Augmented Reality," htps://www.fi.edu/what-is-augmented-reality, The Franklin Institute, Retrieved on Apr. 29, 2022.
"What is WalletConnect," https://www.bitcoin.com/get-started/what-is-walletconnect/#:~:text=WalletConnect%20is%20a%20bridge%20that,manually%20approve%20in%20the%20Wallet, Saint Bitts LLC, Retrieved on Mar. 30, 2022.
Michael E. Porter and James E. Heppelmann, "Why Every Organization Needs an Augmented Reality Strategy," https://hbr.org/2017/11/why-every-organization-needs-an-augmented-reality-strategy, Harvard Business Review, Nov.-Dec. 2017.

\* cited by examiner

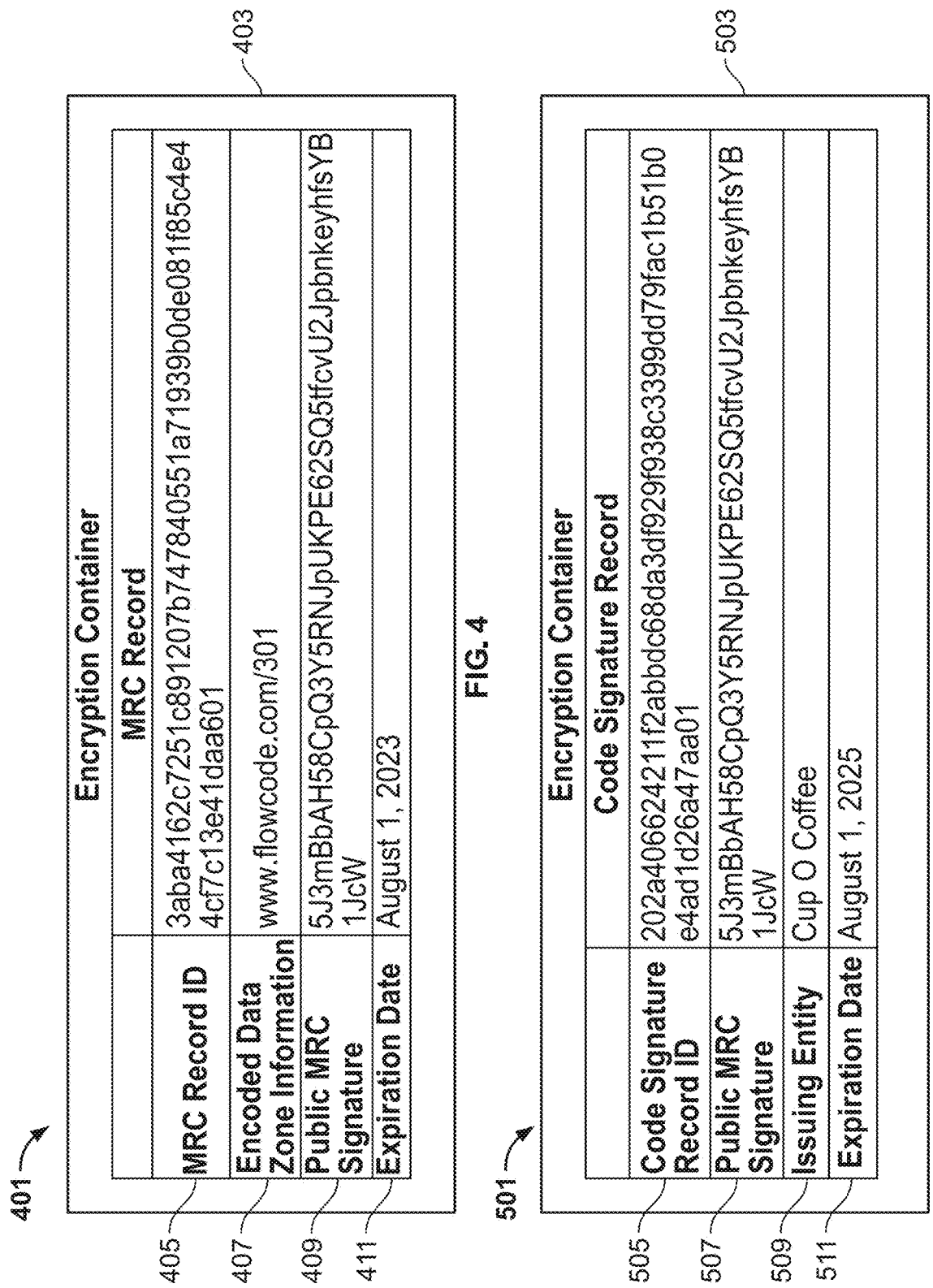

Encryption Container

User1 Record

| | |
|---|---|
| User ID — 605 | e99423a4ed27608a15a2616a2b0e9e52ced330ac530edcc32c8ffc6a526aedd01 — 603 |
| Public MRC Signature — 607 | 5J3mBbAH58CpQ3Y5RNjpUKPE62SQ5tfcvU2JpbnkeyhfsYB1JcW — 601 |
| Email Address Sharing | ON |
| Phone Number Sharing | ON |
| Address Sharing | OFF |
| Data Analytics Sharing | ON |
| Third-Party Sharing | OFF |
| Digital Wallet Linking | ON |

(609)

Encryption Container

User2 Record

| | |
|---|---|
| User ID — 623 | KxFC1jmwwCoACiCAWZ3eXa96mBM6tb3TYzGmf6YwgdGWZgawvrtJ01 — 621 |
| Public MRC Signature — 607 | 5J3mBbAH58CpQ3Y5RNjpUKPE62SQ5tfcvU2JpbnkeyhfsYB1JcW — 619 |
| Email Address Sharing | OFF |
| Phone Number Sharing | OFF |
| Address Sharing | OFF |
| Data Analytics Sharing | ON |
| Third-Party Sharing | OFF |
| Digital Wallet Linking | ON |

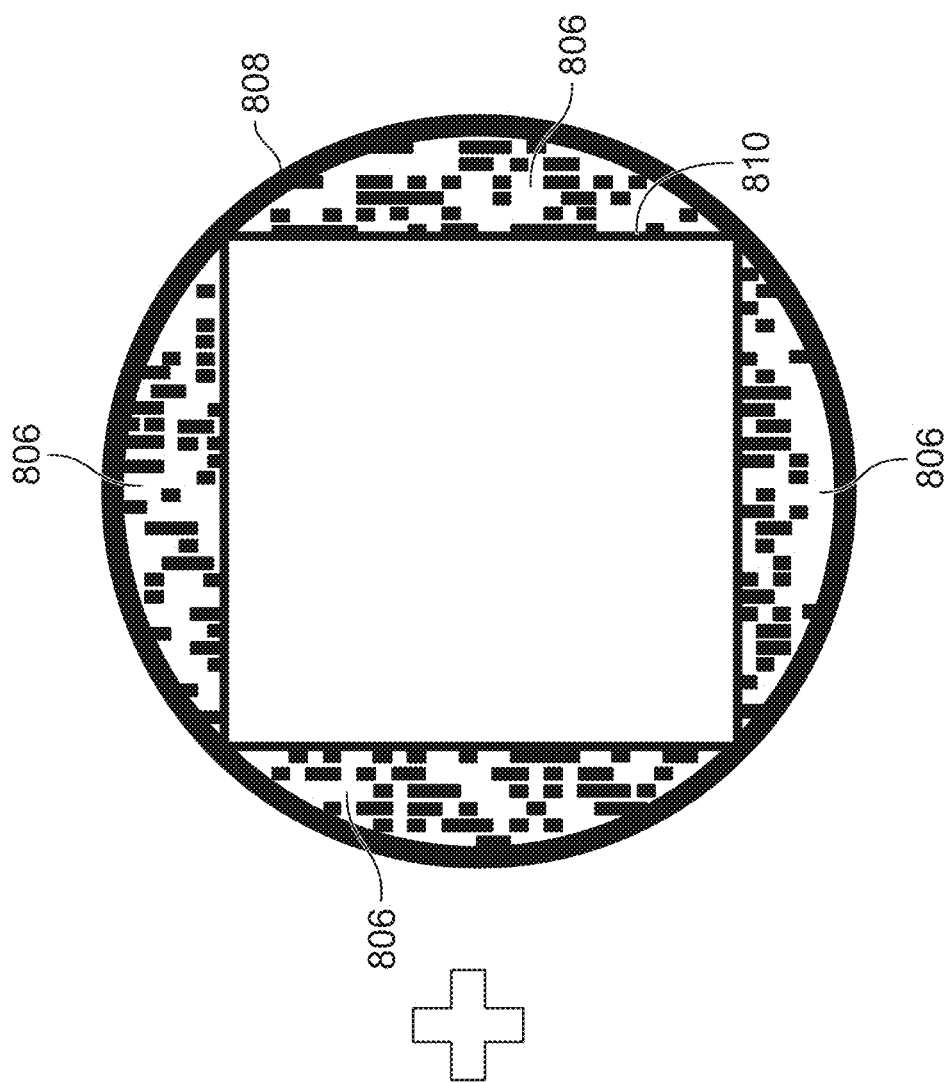
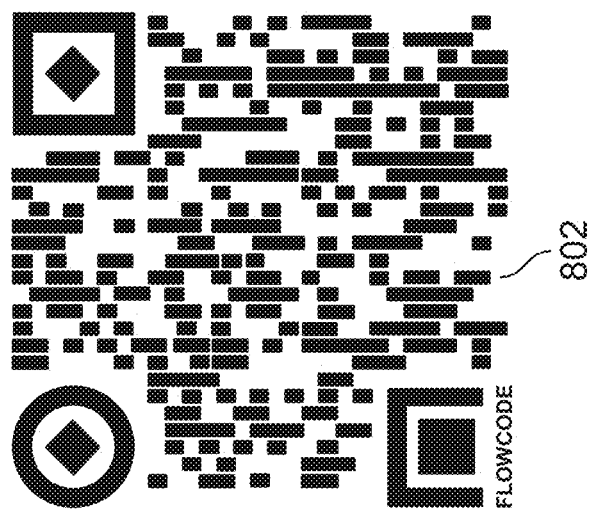
FIG. 8

Process for Claiming and Visualizing an NFT by Scanning an MRC
| Step 4 | After scanning the MRC, the user will be prompted to claim the NFT in their mobile crypto wallet. | 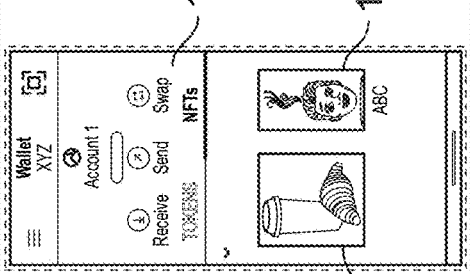 |
|---|---|---|
| Step 5 | Syncing the users digital wallet with flowpage/flowcode website will give authorization for us to visualize the contents of their wallet. | 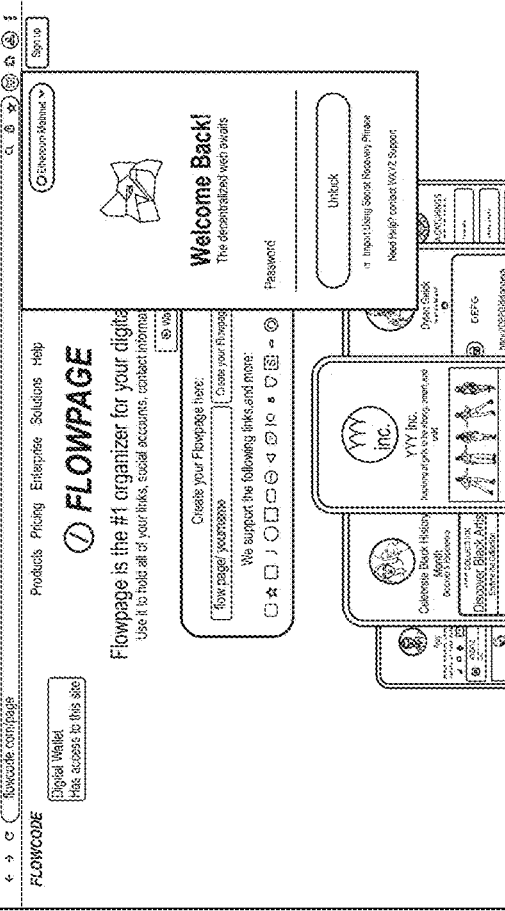 |
FIG. 15 (Cont.)

| | Process for Claiming and Visualizing an NFT by Scanning an MRC |
|---|---|
| Step 6 | NFT visually appears on a Flowpage. Example: https://www.flowcode.com/page/web-3 bottom NFT |
| Step 7 | An MRC is in front of a private club that requires consumers to own an NFT issued by the club in order to get access. A user scans the MRC using their mobile phones native camera. |

FIG. 15 (Cont.)

| Process for Claiming and Visualizing an NFT by Scanning an MRC ||
|---|---|
| Step 8 | The Deeplink behind the MRC directs to the users crypto wallet, and validates the ownership of the NFT via a signature request on the blockchain |
| Step 9 | Your unique NFT will be verified, allowing you access to the venue. |

FIG. 15 (Cont.)

SECURE SCANNING OF MACHINE-READABLE CODES

CROSS-REFERENCE TO RELATED APPLICATIONS

U.S. patent application Ser. No. 17/140,843 filed on Jan. 4, 2021 and entitled MULTIPLEXED QUICK RESPONSE ("QR") CODE EXPERIENCE DERIVATION, is hereby incorporated by reference herein in its entirety. Also incorporated by reference, in their respective entireties, are commonly-assigned U.S. Pat. No. 11,205,105 issued on Dec. 21, 2021 and entitled, MACHINE-READABLE LABEL GENERATOR and U.S. Pat. No. 11,120,095 issued on Sep. 14, 2021 and entitled REFACTORING OF STATIC MACHINE-READABLE CODES.

FIELD OF TECHNOLOGY

Aspects of the disclosure relate to technology for scanning machine-readable codes such as quick-response ("QR") codes.

BACKGROUND

Machine-readable codes such as QR codes provide businesses with a fast and efficient medium for connecting with consumers. Machine-readable instructions, such as a Uniform resource Locator ("URL"), contact information and other information and computer-readable instructions may be encoded in a QR code. Businesses may leverage a machine-readable code ("MRC") to guide consumers to a desired destination (real or virtual) where the customers can access products or services provided by the business. A scanning device is typically used to scan and interpret the instructions encoded in an MRC.

In 2010, 62.6 million people in the United States used smartphones. In 2022 that number is predicted to more than quadruple to over 300 million. Commensurate with increased smartphone use is integration of technology into smartphones that scans and interprets MRCs. Today, many smartphones include a native camera application that can recognize MRCs. There is no need to download and install a separate reader application or use a separate reader to scan and interpret an MRC.

MRCs now offer an inexpensive means of providing many consumers with convenient access to products or services. Consumers are already using their smartphones to search for more information about a product/service of interest. Now, businesses can tap into this tendency by using MRCs to guide consumers to targeted content associated with a product/service. Furthermore, MRCs are inexpensive and easy to print on a variety of surfaces such as business cards, labels, product packaging, posters or marketing materials.

However, the increased use of MRCs such as QR codes has also been associated with increased malicious activity associated with such codes. For example, in January 2022 the Federal Bureau of Investigation ("FBI") issued an announcement to raise public awareness of malicious QR codes. The FBI found that cybercriminals were taking advantage of QR codes to redirect victims to malicious webpages that attempt to steal login and financial information.

For example, businesses and individuals may use QR codes to facilitate payments. A business may provide customers with a QR code directing them to a site where they can complete a payment transaction. A QR code facilitates easy payment because typically, an online payment interface may be hosted on a webpage that has a long, complex and difficult to remember URL. A cybercriminal may generate a QR code that replaces the intended URL with an alternative URL that redirects payments intended for the business to the cybercriminal's use. Malicious QR codes may also embed malware in a scanning device, such as a smartphone, which scans the malicious QR code. The malware may attempt to gain access to the scanning device for cybercriminal use.

To mitigate risk associated with malicious QR codes, the FBI announcement advised users to check the URL after scanning a QR code to make sure it is the intended webpage and looks authentic. The FBI announcement also suggests verifying authenticity of a QR code by using a known number or address to contact a creator of the QR code. The FBI announcement also suggests avoiding making payments through a website accessed by scanning a QR code. Rather than scanning a QR code to complete a payment, a safer approach would be to manually enter a known and trusted URL into a browser.

However, manual checking of URL is difficult. A malicious URL may be very similar to the intended URL but with typos or a misplaced letter. The typos or misplaced letters may be difficult for humans to detect quickly. Furthermore, an important advantage of a QR code or other MRC is that URLs may be lengthy and include segments that are unintelligible to humans. Thus, it is difficult for humans to remember URLs or accurately check their authenticity. Additionally, scanning software that reads an MRC may only display a URL extracted from an MRC in a small font or may not display the complete URL encoded in the scanned MRC.

Contacting an apparent source that created a QR code using a known number or address is cumbersome and tedious. Additionally, manually entering a URL injects additional risk of human error. Risk of entering the wrong URL is further exacerbating when entering the information on smartphone or other mobile device that have relatively small screens. Finally, a known number or address for verifying authenticity of a QR code may not be readily available to a user.

However, despite the difficulty and drawbacks associated with the FBI's suggested strategies, such manual verification methods are the only ones currently available for authenticating a QR code or other MRC. The use and proliferation of QR codes has grown in large part due to the standardized format of QR codes. Readability of QR codes is generally governed by publicly accessible standards. For example, a standardized appearance of a QR code may be defined by one or more standards published by the International Organization for Standardization (ISO) of Geneva, Switzerland. Illustrative standards published by the ISO include ISO/IEC 18004:2015 and ISO/IEC 24778:2008 which are hereby incorporated herein by reference in their entireties. The open and standardized appearance of a QR code makes it technically difficult to imbed or layer additional safeguards for detecting malicious QR codes.

It would be desirable to provide apparatus and methods for authenticating QR codes and other MRCs. It would be desirable to provide automated tools that verify an MRC does not include a malicious URL or other malware before allowing a scanning device to take action in response to scanning the MRC. It would be desirable to provide apparatus and methods for authenticating MRCs without requiring any manual human intervention. Accordingly, it is desirable to provide apparatus and methods for SECURE SCANNING OF MACHINE-READABLE CODES.

BRIEF DESCRIPTION OF THE DRAWINGS

The objects and advantages of this disclosure will be apparent upon consideration of the following disclosure, taken in conjunction with the accompanying drawings, in which like reference characters refer to like parts throughout, and in which:

FIG. 4 shows illustrative information generated by a software tool in accordance with principles of the disclosure;

FIG. 5 shows illustrative information generated by a software tool in accordance with principles of the disclosure;

FIG. 6 shows illustrative information generated by a software tool in accordance with principles of the disclosure;

FIG. 8 shows illustrative components of a machine-readable code in accordance with principles of the disclosure;

DETAILED DESCRIPTION

Figure 1:
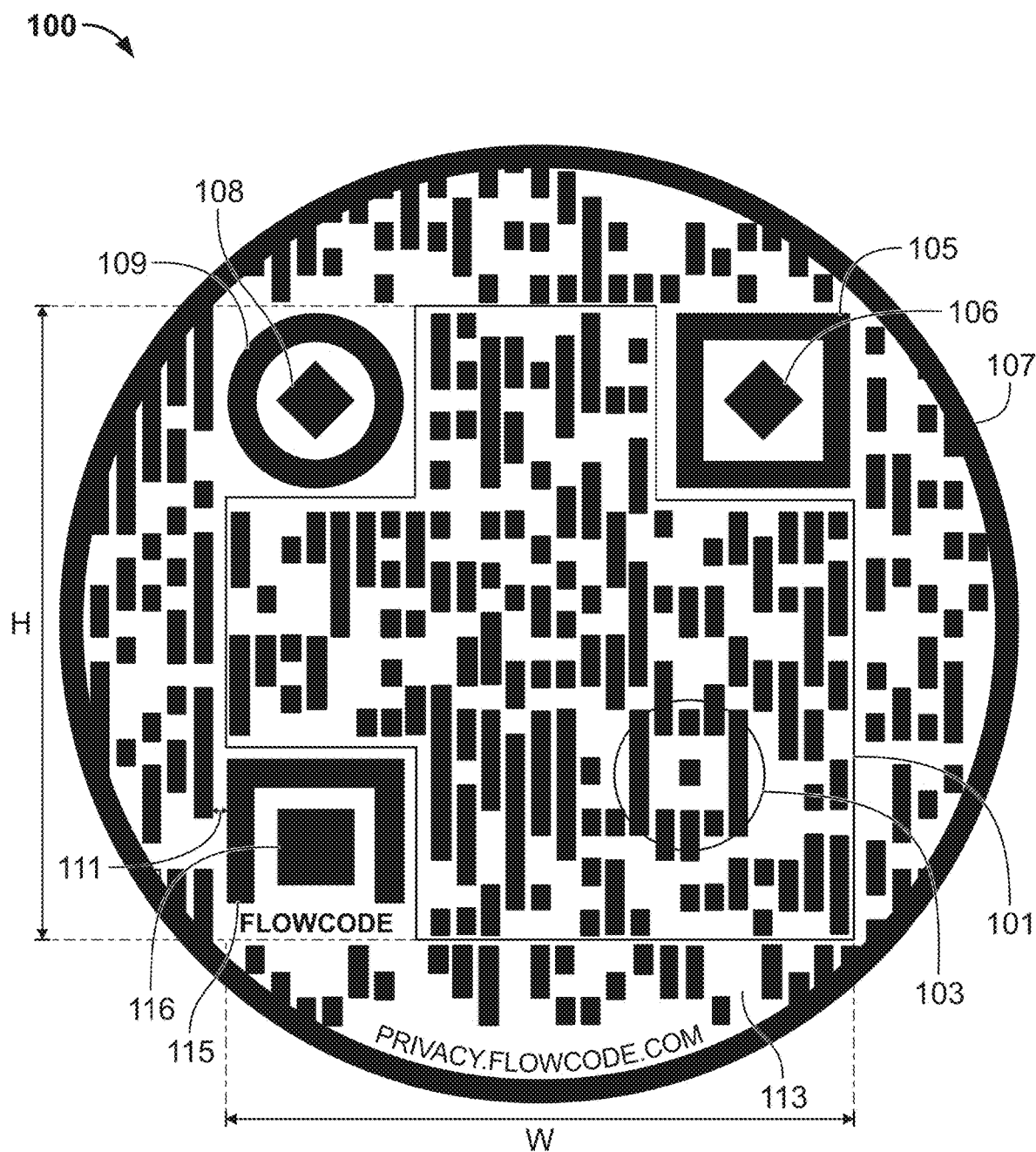
FIG. 1 shows an illustrative machine-readable code in accordance with principles of the disclosure.

Methods for verifying authenticity of a machine-readable code ("MRC") are provided. The methods may be implemented by a system of one or more computers that are programmed to perform particular operations or actions by virtue of having software, firmware, hardware, or a combination of them installed on the system. The software, when executed by a processor of the system, in operation causes or cause the system to perform the actions. One or more computer programs can be configured to perform particular operations or actions by virtue of including instructions that, when executed by data processing apparatus, cause the apparatus to perform the actions.

An MRC may include a plurality of modules. A module may be a dark module or a light module. A scanning device, such as a smartphone, may be configured to interpret a pattern of light and dark modules. For example, the scanning device may interpret the pattern of modules as a binary encoded message. A light module may represent a 0, and a dark module may represent a 1.

Methods may include capturing information encoded in an MRC. Any suitable technology for capturing information encoded in an MRC may be referred to herein as a "scan" of the MRC. A device that captures information encoded in an MRC may be referred to herein as a "scanning device." An operator of a scanning device may be referred to herein as a "user." The user typically wishes to access the URL, content or other functionality triggered by scanning an MRC.

The scanning device may capture the encoded information optically, using a camera of the scanning device. The encoded information may be captured in any suitable manner. For example, the information encoded in an MRC may be captured using near field communication ("NFC"), Bluetooth, 5G communication between the MRC and the scanning device. Methods may include using any suitable technology or protocol to capture information encoded in an MRC.

Methods may include receiving information encoded in an MRC and read by a scanning device. Before processing instructions encoded in the MRC, methods may include verifying whether a record stored on a distributed ledger confirms that the scanned MRC does not include malware.

A distributed ledger system may include a decentralized and tamperproof database. The tamperproof database may store electronic data records. Records stored in the database may gathered into "blocks." A complete copy of all the electronic records stored within the database may be stored on multiple computer systems. Each computer system that stores a complete copy of records in the database may be a "node."

Each record or block of records stored in the database may be linked or "chained" (hence the term "blockchain") to another record or block. The linkage or chaining may be structured such that a change to information in any single record triggers a change to other records linked to the changed record. Each record stored within the database of the distributed ledger may include data and metadata. Metadata may include a reference to a previous record in the chain and a unique identifier generated based on metadata of the previous record.

Records part of the distributed ledger may be linked to one another and secured using cryptography. For example, a unique identifier associated with a record may be an output of a hash function. A change of even one letter in the underlying record may result in a different output of the hash function. Thus, for a malicious actor or node to alter a record stored in the distributed ledger, the malicious node would need to change all records that have been, and will be, subsequently linked to the changed record. As will be explained below, a distributed ledger may require execution of a consensus mechanism before allowing any changes to records stored on the distributed ledger. The consensus mechanism may be structed so that the task of changing a record is computationally unfeasible. Therefore, the distributed ledger may provide tamperproof and auditable storage of records.

A distributed ledger system may include protocols that allow records to be audited by any node or any other computer systems. Records stored in a distributed electronic ledger system may only be added to the system when the nodes participating in the distributed ledger reach agreement in accordance with a consensus mechanism in effect for the distributed ledger.

One exemplary consensus mechanism is proof of work. Each node that wises to store a new record on the distributed ledger must successfully solve a computationally intensive task or puzzle before being authorized to add the new record. The proof of work is typically complex to solve and at the same time easily verifiable by other nodes after being solved. This dichotomy ensures that only one node is authorized to add a new record and that all other nodes can easily verify that the new record has been properly linked to prior records.

The computationally intensive nature of the proof of work process provides tamperproof and auditable storage of records. It is computationally expensive for a malicious node to modify records and attempt to corrupt their contents. Other nodes on the network continuously generate new records, outrunning the malicious node in the process of adding new records to the distributed ledger system. Therefore, a trusted branch of records will grow faster than any new records generated by the malicious node. Nodes participating the distributed ledger system are programmed to recognize the longest branch of records as the authoritative source of information on the distributed ledger. The trusted nodes will therefore invalidate any shorter branches created by the malicious node.

In order for the malicious node to successfully add a manipulated record to the distributed ledger system, it would be necessary for the malicious attacker to solve the proof of work faster than the rest of nodes on distributed ledger system. On a distributed ledger system, this is structured to be computationally too expensive for the malicious node. Accomplishing this feat would require having control of at least 51% of the computing resources in use on the distributed ledger system. The distributed ledger system may use any suitable consensus mechanism that causes data manipulation to be unfeasible for the malicious node. Other exemplary consensus mechanisms may include Delegated Proof of Stake, Transaction as Proof of Stake or Delegated Byzantine Fault Tolerance.

The distributed ledger may be a public or nonpermissioned distributed ledger. A public distributed ledger does not have restrictions on nodes that may participate in the consensus mechanism. The distributed ledger may be a private or permissioned distributed ledger. A private distributed ledger may include restrictions on who may participate in the consensus mechanism. A private or permissioned distributed ledger reach a consensus (or rejection) of a record faster than a public distributed ledger. A distributed ledger may utilize a combination of private and public node participation to establish a consensus. For example, the distributed ledger may require a threshold number of private and/or public node "approvals" before adding a record to the distributed ledger.

A distributed ledger may be used to create an MRC authority forum. The MRC forum may include members that create trusted MRCs and are capable of verifying that an MRC scanned by a user is a trusted MRC. Members of the forum may be represented as nodes authorized to add a new record, delete a record or make any other change to a distributed ledger. Nodes authorized to make changes to records stored on the distributed ledger may be referred to as "trusted" nodes. In some embodiments, trusted nodes may collectively participate in a consensus mechanism to change records stored on the distributed ledger. In some embodiments, each node on a permissioned distributed ledger may be a trusted node and therefore, a rigorous consensus mechanism may not be needed.

The trusted nodes may add or remove user records from the distributed ledger. For example, a trusted node may allow a user to "opt in" and share user information with an entity that created an MRC. Exemplary user information may include a user's email, address, location and demographic information. Trusted nodes may allow a user to "opt out" or revoke the sharing of user information previously authorized.

A redirect system may formulate content for display on a scanning device or trigger an action on the scanning device in response to an MRC scan. An illustrative redirect system is described in U.S. Pat. No. 11,120,095, titled "Refactoring of Static Machine-Readable Codes" and issued on Sep. 14, 2021, which is hereby incorporated by reference herein in its entirety.

The redirect system may formulate the displayed content or trigger the action autonomously based on processing sharable user information and/or applying one or more artificial intelligence algorithms to the sharable user information and instructions encoded in a scanned MRC. The redirect system may be a software application resident on a scanning device. The redirect system may be a cloud-based application hosted on a remote computer server.

Sharable user information may include captured scan event details. Illustrative scan event details may include a scan time, scan location, biometric and physiological characteristics, (fingerprint, facial scan, heart rate), demographic information and other information that may be correlated to a scan of the MRC. Illustrative examples of such other information may include weather, traffic patterns, ongoing sporting events and current events. Scan event details may be determined by a scanning device. For example, a scanning device may capture a timestamp, a GPS location and a user facial scan.

Illustrative scan event details may include a scanning device type. Illustrative examples of device type may include operating system of a scanning device (e.g., android, iOS), manufacturer (e.g., Apple, Samsung), capabilities of a camera (e.g., number of mega pixels) of the scanning device, or a hardware identifier of communication circuitry of the scanning device (e.g., a media access control ("MAC") address).

The MRC forum may provide a publicly readable distributed ledger that is tamperproof relative to untrusted nodes. Untrusted nodes may not be members of the forum and may not participate in a consensus mechanism for making changes to the distributed ledger. Untrusted nodes that may rely on the integrity records stored in the distributed ledger may include scanning devices that extract instructions from scanned MRCs and applications that are triggered or loaded by the instructions encoded in the scanned MRCs.

Trusted nodes may apply digitally signatures to records added to the distributed ledger. The digital signatures may be validated by any node (trusted or untrusted) to verify authenticity of a scanned MRC and instructions encoded therein. The digital signature of a trusted node may be encoded in an MRC. The digital signature may be extracted by a scanning device that scans the MRC. Validating a digital signature encoded in the MRC may confirm that the scanned MRC was created by a trusted node and therefore encodes instructions that do not contain malware or otherwise safe to be processed by a scanning device.

A trusted node may also apply the digital signature to records stored on the distributed ledger. Such a record may be a "code record" that corresponds to an MRC. A code record may have a unique identifier the corresponds to an MRC. The unique identifier may a URL or other instructions encoded in the MRC. The code record may identify a creator of the MRC. A creator of an MRC may be an entity that distributes the MRC. A creator of an MRC may be an entity that creates or is otherwise identified in content presented to a user after scanning the MRC.

A code record may store a copy of the instructions encoded in an MRC. A digitally signed code record may only be added to the distributed ledger after execution of a consensus mechanism. The consensus mechanism may ensure that the trusted nodes have validated the digitally signature applied to the code record. The consensus mechanism may include validating that the digital signature has been applied by a trusted node. Before executing instructions encoded in a scanned MRC, trusted nodes may validate a digital signatures applied to a code record corresponding to the scanned MRC.

In some embodiments, only trusted nodes may add or delete records from a permissioned distributed ledger. Before processing instructions encoded in a scanned MRC, methods may include checking whether a code record corresponding to instructions encoded in the scanned MRC has been stored on a distributed ledger. In such embodiments, a digital signature may not be applied to code records. The very fact a code record corresponding to the scanned MRC has been saved and is available on the distributed ledger provides confirmation that the code record (and the corresponding MRC) has been validated by a trusted node. Methods may include, in response to locating a code record stored on the permissioned distributed ledger, processing instructions encoded in the scanned MRC.

Methods may include, in response to receiving a scan of an MRC, locating a user record stored on the distributed ledger. The user record may include user information. The user information may define privacy permissions of a user. The user information may define privacy permissions defined by the user with respect to MRCs associated with associated with a target MRC owner. An MRC owner may control content encoded in an MRC. An MRC owner may be responsible for creating and maintaining content or actions triggered by scanning an MRC. An MRC owner may create, distribute and position MRCs in physical or virtual locations. An MRC owner may monitor performance metrics associated with scans of an MRC.

User defined privacy permissions may control what if any, information a trusted node is allowed to share with an owner of a scanned MRC. User defined privacy permissions may control what if any, user information a trusted node is allowed to share with a redirect system that is triggered after scanning an MRC. A user may revoke or change privacy permissions. When a user revokes or changes privacy permissions, an updated user record may be added to the distributed ledger that defines the updated privacy permissions. In embodiments where the distributed ledger is a permissioned distributed ledger, methods may include revoking privacy permissions by deleting the user record.

Illustrative user information may include contract information (phone, email, address, social handle, etc . . . ). User information may include performance metrics associated with a user. Illustrative performance metrics may include user activity on a landing page displayed in response to scanning an MRC or a level of engagement and interaction with content displayed in response to scanning the MRC. Performance metrics may be captured by a redirect system.

Illustrative user information may include a user identifier. Illustrative user information may include an owner identifier. The owner identifier may correlate a user record to an MRC owner. The user information in the user record may be shared with the MRC owner listed in the user record. A separate user record may be created for each MRC owner. The user information may include two or more owner identifiers. The user information included in the user record may be shared with each of the MRC owners. The user information may be shared with the MRC owners in response to a scan of an MRC associated with any of the MRC owners. A code record may link an MRC to an MRC owner.

A digital signature may be applied to a user record. Validating the digital signature may confirm that the authorization to share the user information listed in the user record has been confirmed by a trusted node. After validating the digital signature applied to the user record, user information may be extracted from the user record. The extracted user information may be transmitted to a destination landing page encoded in the scanned MRC.

In some embodiments, a user record may list categories of user information that are sharable with an MRC owner. The user record may not include the underlying user information for each category. The underlying user information for each category may not be stored on the distributed ledger. After validating the user record and categories of user information listed therein, a trusted node may instruct a redirect system (or other repository storing the underlying user information) to share the underlying user information with the authorized MRC owner.

A digital signature may be generated by a private cryptographic key. The private cryptographic key may be stored in a digital wallet. A digital wallet may include devices and programs used for executing electronic transactions. A digital wallet may include an electronic device (e.g., smartphone) that stores payment information and the computer program (e.g., application) used to execute a transaction. Executing a transaction may include generating a digital signature that may be later validated to authenticate a transaction.

The digital wallet may be stored on a scanning device. The digital wallet may be stored on a remote computer system. A digital wallet may also hold other information, such as identity credentials, transportation tickets, event tickets, loyalty or gift credentials.

The methods may include executing, on a processor, machine-executable instructions that locate a user record stored on the distributed ledger based on a public cryptographic key paired to a private cryptographic key. For example, a user's scanning device may share a public key or a digital signature creating using the user's private key with a trusted node operating on the distributed ledger. Using the provided public key, the trusted node may determine whether a corresponding user record is stored on the distributed ledger. For example, the trusted node may determine whether a user record includes a digital signature created with the user's private key. The trusted node may validate the digital signature with the user's public key.

In some embodiments, trusted nodes may generate digital signatures. The trusted nodes may apply those digital signatures to code records they add to the distributed ledger. The trusted node's public cryptographic key may be used by any other node or scanning device to verify that a code record has been digitally signed by the trusted node. Methods may include validating a digital signature associated with a code record corresponding to a scanned MRC before allowing the scanning device to process information encoded in the scanned MRC.

A trusted node may create signed MRCs on behalf of an owner. The trusted node may utilize an MRC generator to create MRCs. An illustrative MRC generator is described in U.S. Pat. No. 11,010,650, entitled "Machine-Readable Label Generator," issued on May 18, 2021 and incorporated by reference herein in its entirety. A trusted node may apply a digital signatures to MRCs it creates. The trusted node's public cryptographic key may be used by any other node or scanning device to verify that the digital signature has been generated using the private cryptographic key of the trusted node. Thus, a scanning device may, before processing any information or instructions encoded in an MRC, confirm that the scanned MRC include the digital signature of a trusted node.

A trusted node may create digitally signed user records on behalf of a user. A user record may include a digital signature generated based on a private cryptographic key of a trusted node. The digital signature may indicate that the trusted node has been authorized to add the user record to the distributed ledger. The user record may include an identifier corresponding to an MRC owner. A code record stored on the distributed ledger may also include the identifier corresponding to the MRC owner. In some embodiments, the MRC itself may include encoded instructions that identifies the MRC owner of the MRC.

A link may be established between a code record and a user record. Common data elements may appear in the code record and in the user record. For example, the code record and the user record may both include an identifier corresponding to a target MRC owner. As a further example, the code record and the user record may both include a digital signature generated based on the private cryptographic key controlled by a trusted node.

Using the trusted node's public key, a smart contract running on a distributed ledger may automatically identify code and user records digitally signed by the trusted node's private key. The smart contract may also automatically locate user records that include an identifier of the MRC owner of a scanned MRC. In some embodiments, a redirect system may correlate a code record or information encoded in a scanned MRC to a user record.

A smart contract may include machine executable instructions running on a computing system. The executable instructions may be self-executing and trigger actions at specified times and/or based on reference to the occurrence or non-occurrence of a target action or event. Some or all of computer executable instructions may be embodied in hardware or firmware components of a computing system.

A smart contract may be run in cloud computing and virtualization implementations of software. Such implementations may be designed to run on a physical apparatus supplied externally by a hosting provider, a client, or other virtualized platform. Smart contracts may utilize computer-executable instructions, such as program modules, executed by a processor on the computing system. Generally, program modules include routines, programs, objects, components, data structures, etc. that perform particular tasks or implement particular abstract data types. Smart contracts may be operational with distributed computing environments where tasks are performed by remote processing devices that are linked through a communications network.

In a distributed computing environment, program modules may be located in both local and remote computer storage media including memory storage devices. Smart contracts may rely on a network of remote servers hosted on the Internet to store, manage, and process data (e.g., "cloud computing" and/or "fog computing"). For example, smart contracts may be run on nodes that form a distributed ledger.

Methods may include encrypting a user record. The user record may be encrypted by using the trusted node's public cryptographic key. The trusted node may encrypt user records. A user may create encrypted user records. The user may store the trusted node's public key in a digital wallet. Methods may include decrypting the user record. The user record may be decrypted using a private cryptographic key paired to the public cryptographic key. Only the trusted node may decrypt user records encrypted using its public key.

In response to detecting a scan of an MRC, a trusted node that digitally signed the scanned MRC or corresponding code record may be requested to decrypt any user records associated with the MRC's owner. The trusted node may decrypt user information included in a user record. The trusted node may access underlying user information corresponding to sharable categories of user information listed in the decrypted user record. A smart contract running on a distributed ledger may be programmed to automatically correlate the scanned MRC, trusted node, code records and associated user records.

Methods may include generating custom content in response to an MRC scan. Methods may include generating a redirect link that when transmitted to a scanning device, directs the scanning device to the custom content. The custom content may be generated based on correlating a code record or information encoded in an MRC with a user record. Custom content may be generated for a scanning device based on user information authorized for sharing with the MRC owner of the scanned MRC. Methods may include sharing the decrypted user information with the owner of a scanned MRC identified in a user record.

An MRC scan may be a first scan of the MRC. Methods may include preventing the processing of instructions encoded in the scanned MRC in response to a second scan of the MRC by deleting a private cryptographic key used to validate digital signature associated with the MRC. Without the private key, digital signatures created using the public key cannot be validated by a trusted node. The trusted node may reject processing of any instructions received from a scanned MRC whose digital signature (e.g., encoded in the MRC or a corresponding code record) cannot be validated.

Apparatus for a trusted machine-readable code ("MRC") system architecture is provided. The architecture may include machine-executable instructions stored in a non-transitory memory. The machine-executable instructions may be executed by a processor. When the machine-executable instructions are executed by the processor, the processor may be programmed to perform various functions.

The architecture may include an MRC. The MRC may include first machine-executable instructions. The MRC may include a data zone. The first machine-executable instructions may be encoded in the data zone. The MRC may include a digital signature. The digital signature may be included in any suitable portion of an MRC. For example, an MRC may include a pattern of modules that encodes the digital signature. The pattern of modules may be inside a data zone of the MRC. The pattern of modules may be outside the data zone of the MRC.

The digital signature may be generated based on the first machine-executable instructions and a private cryptographic key. Access to the private cryptographic key may be controlled by an owner of the MRC. Access to the private cryptographic key may be controlled by a trusted node that operates on a distributed ledger. The digital signature may be generated by inputting the first machine-executable instructions encoded in an MRC and the private cryptographic key into a hash function.

The architecture may include second machine-executable instructions. The second machine-executable instructions may be stored in a non-transitory memory. The second machine-executable instructions may be executed by a processor. When the second machine-executable instructions are executed by the processor, the processor may be programmed to perform various functions. The processor may be local to a scanning device. For example, the second machine-executable instructions may be an application installed on a mobile device. The processor may be part of a remote computer system. For example, the processor may be part of a redirect system.

In illustrative scenario, a scan of the MRC may be captured by a scanning device. The scanning device may automatically detect a presence of the MRC and capture the first machine-executable instructions included in the MRC. The scanning device may extract a digital signature encoded in the MRC. The processor may extract the first machine-executable instructions and the digital signature encoded in the scanned MRC.

The second machine-executable instructions may program the processor to determine whether a code record corresponding to the scanned MRC is stored on a distributed ledger. A code record corresponding to the MRC may include the first machine-executable instructions extracted from the scanned MRC. An exemplary distributed ledger may include a blockchain system. The processor may be configured to verify that the code record stored on the distributed ledger has been signed using the private cryptographic that also generated the digital signature included in the scanned MRC.

The processor may determine whether the code record has been validly signed by using a public cryptographic key. The public cryptographic key may be paired to a private cryptographic key. Access to the private cryptographic key may be controlled by an owner of the scanned MRC. The owner of the MRC may keep the private cryptographic key secret, so it has exclusive access to generate digital signatures based on the private cryptographic key. The private cryptographic key may therefore function as a unique identifier corresponding to the owner of the scanned MRC.

A public cryptographic key may be paired to the private cryptographic key. The public cryptographic key may be derived from the private cryptographic key. A mathematical relationship may link the public and the private keys. The mathematical relationship allows the private key to generate digital signatures that can be validated using the public key without revealing the private key. The public cryptographic key may be freely shared. Others may utilize the public cryptographic key to verify whether a digital signature has been generated using the private cryptographic key.

A digital signature may be generated by inputting a message into a hash function. The message may be a web address, machine-executable instructions included in an MRC, document, picture, or any other data. An output of a hash function is a fixed-length string of numbers and letters. The fixed-length string is unique to the message input to hash function. Any changes to the message will result in a different hash output. A hash function is also a one-way function—a computed hash output cannot be reversed to find other data that may generate the same hash output. Illustrative hash functions include Secure Hash Algorithm-1 (SHA-1), the Secure Hashing Algorithm-2 family (SHA-2 and SHA-256), and Message Digest 5 (MD5).

A digital signature may be generated by encrypting the hash output with a private cryptographic key. To validate the message, a recipient uses the paired public key to decrypt the hash output. The recipient then uses the same hashing function that generated the original hash output to generate a new hash output of the decrypted digital signature (hash output generated by the signer). Information about the hashing function used by the digital signer and the paired public key may be sent along with the digital signature.

Finally, the recipient of the message compares the decrypted hash output and its newly generated hash output of the received message. If they are identical, the message has not changed since the sender digitally signed it. If the hash outputs do not match, the message may have been tampered with after it was digitally signed, or the digital signature may have been created with a private key that does not correspond to the public key presented by the signer/sender.

The second machine-executable instructions may use a public cryptographic key to determine whether a code record stored on the distributed ledger includes a digital signature generated by using a private cryptographic key of the owner of a scanned MRC. When the code record is stored on the distributed ledger and confirmed to have been validly signed, the processor may direct the scanning device (or redirect system) to process the first machine-executable instructions encoded in the scanned MRC. Processing the first machine-executable instructions may include directing the scanning device to a destination landing page. For example, the first machine-executable instructions may include a URL. The landing page may be generated based on the URL and scan event details captured when the MRC was scanned.

In some embodiments, a trusted node that operates on a permissioned distributed ledger may authenticate an MRC before the MRC is scanned. For example, an MRC owner may provide the MRC to a trusted node. The trusted node may confirm that the instructions encoded in the MRC do not include malware. In some embodiments, the trusted node may create the MRC for the MRC owner. After confirming that the MRC does not include malware, the trusted node may create a code record corresponding to the MRC. The code record corresponding to an MRC may include an owner of the MRC. The code record may include the information encoded in the MRC. The code record may include a digital signature included in the MRC. The code record may include a hash output determined based on data zone.

The trusted node may store the code record on the permissioned distributed ledger. The other trusted nodes may confirm the authenticity of the code record by executing a consensus mechanism before allowing the code record to be stored on the permissioned distributed ledger. After the code record is stored on the permissioned distributed ledger, detecting a presence of the code record on the distributed ledger may confirm authenticity of the MRC corresponding to the code record.

Confirming authenticity of a scanned MRC may confirm that the MRC does not include malware. When the processor is unable to confirm authenticity of a scanned MRC, the processor may upload the first machine-executable instructions extracted from the MRC to a safe zone. The safe zone may be an isolated memory location. The safe zone may be an isolated memory location within the scanning device.

In some embodiments, the processor may cause the first machine-executable instructions to be uploaded to a safe zone within a remote computing system. For example, the safe zone may be an isolated memory location within a redirect system. Within the safe zone, the second machine-executable instructions may prevent execution of the first machine-executable instructions. The safe zone may be inaccessible to processing power needed to execute the first machine-executable instructions encoded in the scanned MRC.

Before releasing the first machine-executable instructions from the safe zone, the processor may determine whether the first machine-executable instructions include malware—short for malicious software. Malware is an umbrella term used to refer to a variety of forms of hostile or intrusive software. Malware is defined by its malicious intent, acting against the requirements, or contrary to the interests, of the scanning user. Malware may include computer viruses, worms, Trojan horses, ransomware, spyware, adware, scareware, and other malicious programs. Malware may take the form of executable code, scripts, active content, and other software.

Malware may include instructions in a scanned MRC that direct a scanning device to a malicious webpage. The malicious webpage may prompt a user to enter login and financial information. Obtaining the login and financial information may give a cybercriminal the ability to potentially steal funds from the user's accounts.

In response to a determination that the first machine-executable instructions include malware, the processor may delete the first machine-executable instructions without any processing of those instructions. Deleting the first machine-executable instructions may prevent a user from accessing a malicious webpage encoded in a scanned MRC or allowing malware to infect a scanning device. The first machine-executable instructions may be deleted after being uploaded to the safe zone.

Authenticating a scanned MRC may include the processor determining whether the scanned MRC includes a verified digital signature or whether a corresponding code record is stored on a permissioned distributed ledger. Verifying the digital signature or locating the corresponding code record may confirm that a reputable owner has created the scanned MRC. Verifying the digital signature or locating the corresponding code record may confirm that the scanned MRC and its encoded instructions originate from a reputable source. Verifying the digital signature or locating the corresponding code record may reduce risk that the scanned MRC includes malware. Verifying the digital signature or locating the corresponding code record may confirm that the scanned MRC does not include malware.

A trusted machine-readable code ("MRC") system architecture is provided. The architecture may include computer systems, apparatus, and computer programs recorded on one or more computer storage devices. Implementations of the architecture may include hardware, a method or process, or computer software on a computer-accessible medium.

The architecture may include an MRC. The MRC may include a digital signature. The MRC may include a data zone that encodes first machine-executable instructions. The digital signature may be encoded in the data zone. The digital signature may be encoded outside the data zone. For example, the digital signature may be encoded in an environmental zone of the MRC.

The digital signature may be generated based on the first machine-executable instructions and a private cryptographic key. An owner or creator of the MRC may control the private cryptographic key. The private cryptographic key may be controlled by a trusted node operating on a distributed ledger. The digital signature may be validated using a public cryptographic key paired to the private key that created the digital signature.

The architecture may include second machine-executable instructions. The second machine-executable instructions may be stored in a non-transitory memory. The second machine-executable instructions, when executed by a processor on a computer system may capture a scan of the MRC. The second machine-executable instructions may program the processor to perform actions that authenticate the scanned MRC. The second machine-executable instructions may program the processor to perform any suitable post-scan actions.

The architecture may detect a scan of the MRC's data zone. In response to detecting the scan, the architecture may capture the digital signature included in the MRC. For example, the digital signature may be encoded outside the data zone, a specialized MRC scanner application may be activated to capture the digital signature. The architecture may validate the digital signature included in the MRC. Validating the digital signature may include confirming that the digital signature has been generated using a private cryptographic key controlled by the trusted node or MRC owner.

After successfully validating the digital signature, the architecture may generate a destination landing page based on the first machine-executable instructions included in the scanned MRC. When the digital signature of the MRC cannot be validated, the second machine-executable instructions may prevent processing of the first machine-executable instructions encoded in the MRC. In response to a failure validate the digital signature, the architecture may create a fraud record.

A fraud record may include information about the scanned MRC. The fraud record may include the same information as a code record discussed above. For example, the fraud record may include a URL encoded in the MRC, a creator of the MRC and instructions encoded in the MRC. In addition, the fraud record may include a field that indicate the digital signature in corresponding MRC could not be validated.

The architecture may include a distributed ledger. The architecture may include a smart contract operating on the distributed ledger. The fraud record may be stored on the distributed ledger. The fraud record may be digitally signed by a trusted node operating on the distributed ledger. In response to an MRC scan, a node may check whether a fraud record corresponding to the scanned MRC is stored on the distributed ledger. Existence of a fraud record corresponding to a scanned MRC may indicate that the scanned MRC includes malware or has a threshold risk of including malware.

Apparatus for a trusted machine-readable code ("MRC") system architecture is provided. The architecture may include a non-transitory computer-readable storage medium with an executable program stored thereon. The non-transitory computer-readable storage medium may program a processor to implement functionality of the architecture.

The architecture may detect a scan of an MRC. The architecture may authenticate a uniform resource locator ("URL"), or other instructions encoded in the scanned MRC. In response to successfully authenticating the instructions encoded in the MRC, the architecture may link a digital wallet to a decentralized application ("dapp"). A dapp may include a computer application built using smart contracts that operate on a distributed ledger. To interact successfully with a dapp, a user links a digital wallet to the dapp. Creating the link gives the dapp permission to access a private key stored in the digital wallet to execute digitally signed transactions and add digitally signed records to the distributed ledger.

The architecture may locate the dapp using a URL or other instructions encoded in the MRC. The MRC may include a (deep) link that triggers a smart contract running on a distributed ledger to establish an encrypted connection between the digital wallet and the dapp. The digital wallet may be stored on a scanning device. A protocol, such as WalletConnect, may allow a user to link one or more digital wallets to one or more dapps.

A cybercriminal may create a malicious dapp (a form of malware) that impersonates a legitimate dapp. The cybercriminal may accomplish this by utilizing a URL similar to a legitimate one associated with a target dapp. For example, the scammer might switch an "o" with a "0" in the URL. To direct unsuspecting users to the malicious dapp, the cybercriminal may distribute MRCs that encode instructions that link to the malicious dapp. For this reason, tools are needed to detect malicious MRCs that redirect unsuspecting users to malicious dapps and associated webpages that attempt to steal login and financial information.

The architecture may authenticate a URL encoded in a scanned MRC before linking a digital wallet to a dapp. Authenticating a scanned MRC may include determining whether the scanned MRC includes a verified digital signature or whether a corresponding code record is stored on a permissioned distributed ledger.

After authenticating the URL, the architecture may then allow linking of the dapp referenced in the scanned MRC to the user's digital wallet. After successfully authenticating the URL and linking the dapp, the dapp may execute a transaction or store records on a distributed ledger using a user cryptographic key stored in the digital wallet.

The architecture may authenticate a URL encoded in a scanned MRC by extracting a digital signature from the scanned MRC. The architecture may locate a public cryptographic key associated with the URL. The public key may also be encoded in the MRC. In some embodiments, the MRC may identify an owner of the MRC. The architecture may locate a public key of the MRC owner. For example, the MRC owner's public key may be available on a publicly accessible webpage or within a record stored on a distributed ledger. The architecture may utilize a public key to verify whether the digital signature authenticates the scanned MRC and the URL encoded in the scanned MRC.

In some embodiments, the MRC may not encode a digital signature. In such embodiments, the architecture may search whether a code record corresponding the scanned MRC is stored on a distributed ledger. The code record may include the URL encoded in the scanned MRC. Locating a code record corresponding to the scanned MRC may authenticate the scanned MRC and the encoded URL. The process of authenticating a scanned MRC may be performed by one or more smart contracts running on a distributed ledger.

After validating the scanned MRC, the architecture may allow a digital wallet to be linked to the dapp referenced by the instructions encoded in the scanned MRC. The scanned MRC may also include instructions that trigger a transaction that utilizes cryptographic keys or other credentials stored in the linked digital wallet. For example, in addition to triggering a linking of the digital wallet to the dapp, the MRC may also encode instructions that trigger execution of a transaction on the distributed ledger that determines whether a private cryptographic key stored in the linked digital wallet owns a non-fungible token ("NFT").

A NFT is unique and non-divisible digital asset. An NFT may be created and controlled by a smart contract operating on a distributed ledger. When an NFT is generated, instructions stored in a smart contract are executed ensuring the NFT conforms to a standard for enforcing one or more properties of the NFT.

An NFT may be generated via a smart contract that assigns ownership and manages transferability of the NFT. For instance, a smart contract can create an NFT and define rights associated with the newly created NFT. Such rights may include preventing or authorizing execution of transactions associated with the NFT and validating an entire transaction history of ownership rights associated with the NFT.

An illustrative standard for creating an NFT includes the ERC-521 or ERC-1155 standards for creating (or "minting"), storing and transferring NFTs on the Ethereum distributed ledger. Other distributed ledgers that include standards for enforcing NFT protocols include the FLOW blockchain, the TEZOS blockchain, and the SOLANA blockchain. NFT generation using the ERC-521 or ERC-1155 standards includes creating a new data record that will stored on a distributed ledger and include information associated with the NFT.

Illustrative information stored in an NFT may include a digital signature of a current owner of the NFT and a description of an asset (tangible or virtual) represented by the NFT. By definition of the appropriate standards, an NFT is digitally unique and no two NFTs are identical. Also, the identity of the original creator of an NFT becomes a permanent part of the NFT's transaction history. The unique identity of a creator stored within the NFT demonstrates original ownership of the NFT or the asset represented by the NFT.

After initial creation of an NFT as a new data record, the NFT is validated by other nodes on a distributed ledger (e.g., the Ethereum distributed ledger). Such validation may include executing a consensus mechanism such as such as Proof of Work, Proof of Stake or Practical Byzantine Fault Tolerance. After the consensus mechanism confirms authenticity of the NFT, the NFT (e.g., the data record) may be recorded on the distributed ledger. After the NFT is stored on the distributed ledger, the information included in the NFT, and all transactions associated with the NFT are traceable and verifiable.

Ownership of an NFT may be correlated to a private cryptographic key. For example, using the private key, an owner of the NFT may digitally sign or encrypt an NFT. Only a public key paired to the NFT owner's private key will successfully verify the digital signature or decrypt the NFT. An owner of the NFT may prove ownership of the NFT by executing or digitally signing a transaction using the same private key used to digitally sign or encrypt the NFT.

In response to determining that the (private) user cryptographic key stored in the user's digital wallet owns an NFT, the architecture may connect the NFT to the dapp. The linking of the NFT and dapp allows the NFT to be accessed by the dapp. The dapp may display the NFT or an assert represented by the NFT. The dapp may utilize verified user ownership of the NFT to authenticate the user and provide other services or products to the user.

For example, after linking the NFT to the dapp, the dapp may allow the user to access a restricted venue based on confirming user ownership of the NFT. The restricted venue may be a real-world or virtual venue. The operator of a restricted venue may mint NFTs. The operator may distribute NFTs to users that are authorized to access the restricted venue. The distributed NFTs may be associated with credentials stored in a user's digital wallet.

An MRC may be posted at an entrance (physical or virtual) to the restricted venue. The MRC may encode instructions, that when scanned by a scanning device, trigger activation of a dapp (or other smart contract) linked to a digital wallet. The digital wallet may be installed on the scanning device or be accessible from the scanning device. Before processing the instructions encoded in the scanned MRC, the scanned MRC may be validated using processes described herein (e.g., validating a digital signature or locating a corresponding code record stored on a distributed ledger).

After successfully validating the scanned MRC, the instructions encoded in the scanned MRC may be executed. The dapp or smart contract may determine whether credentials stored in a digital wallet associated with the scanning device confirm ownership of an NFT distributed by the operator of the restricted venue. In response to determining that the credentials stored in the digital wallet confirm ownership of an NFT distributed by the operator of the restricted venue, the dapp may allow the user access to the restricted venue.

Other dapps may provide tools for visualizing an NFT. Visualizing an NFT may include displaying an underlying asset represented by the NFT. The underlying asset may be digital art or any other electronic media. The NFT may be visualized on a webpage. An MRC may be utilized to provide access to the webpage and locate a target NFT to be visualized.

A user may scan an MRC. The MRC may encode instructions, that when read by a scanning device, trigger activation of a dapp (or other smart contract) linked to a digital wallet. The digital wallet may store cryptographic keys or other credentials. Before processing the instructions encoded in the scanned MRC, the scanned MRC may be validated using processes described herein (e.g., validating a digital signature or locating a code record stored on a distributed ledger).

After successfully validating the scanned MRC, the instructions encoded in the scanned MRC may be executed. The MRC's instructions may trigger activation of the dapp. The dapp may locate the NFT and the webpage referenced in the MRC and linked to credentials stored in the user's digital wallet. The dapp may generate a visualization of the NFT on the webpage.

The dapp may generate a visualization of the NFT on the webpage based on one or more scan event details. For example, the dapp may generate a visualization of the NFT in a first perspective when captured scan event details indicate the MRC was scanned during nighttime hours. The dapp may generate a visualization of the NFT in a second perspective when captured scan event details indicate the MRC was scanned during daytime hours.

The scan of the MRC may trigger the dapp to execute a transaction. The transaction may be executed on a distributed ledger. An illustrative transaction may include minting an NFT. The transaction may include assigning ownership of the NFT to a cryptographic key or other credentials stored in a user's digital wallet.

A system that secures access of a digital wallet to a decentralized application ("dapp") is provided. The system may include an MRC. The MRC may encode first machine-executable instructions.

For example, the first machine-executable instructions may be encoded in a data zone of the MRC. The system may include a digital signature. The digital signature may be generated based on the first machine-executable instructions and a private cryptographic key. The digital signature may be encoded in the MRC. For example, the digital signature may also be encoded in the data zone of the MRC.

The system may include second machine-executable instructions. The second machine-executable instructions may be stored in a non-transitory memory. The system may include a processor. The second machine-executable instructions, when executed by the processor, may program the processor to perform various functions. The processor may be programmed to detect a scan of the MRC.

In response to detecting the scan, the processor may determine whether the scanned MRC includes the digital signature. The processor may be programmed to validate the digital signature. The processor may validate the digital signature by checking whether the digital signature is recorded in a code record stored on a distributed ledger. The processor may validate the digital signature by using a public cryptographic key to determine whether the digital signature was generated using a private cryptographic key paired to the public key. The processor may validate the digital signature before taking any action based on the first machine-executable instructions encoded in the scanned MRC.

After validating the digital signature, the processor may use the first machine-executable instructions to link a digital wallet to a dapp. The digital wallet may be a custodial wallet stored on the scanning device. The first machine-executable instructions may include a web address or other instructions for connecting to the dapp. When the processor is unable to validate the digital signature included in the MRC, the processor may not take any action based on the first machine-executable instructions.

The processor may be programmed to determine whether credentials stored in the digital wallet evidence ownership of an NFT. The processor may determine whether the credentials evidence ownership of an NFT minted by the private cryptographic key that was used to create the digital signature included in the scanned MRC. In response to determining that the credentials evidence ownership the NFT, the processor may link the NFT to the dapp. In response to determining that the credentials do evidence ownership the NFT, the processor may generate a visualization of the NFT.

Generating a visualization of the NFT may include initiating an augmented reality view of an object associated with the scanned MRC. For example, the MRC may be placed on a landmark or other physical geographic location. Augmented reality includes superimposing computer-generated content (e.g., images or video) on real world objects or environments. A scan of the MRC may provide geolocation information. For example, the geolocation may be captured as a scan event detail. A geolocation of the MRC may be included in the first machine-executable instructions included in the scanned MRC.

Apparatus and methods in accordance with this disclosure will now be described in connection with the figures, which form a part hereof. The figures show illustrative features of apparatus and methods in accordance with the principles of this disclosure. It is understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method and/or apparatus described herein.

Apparatus embodiments may omit features shown and/or described in connection with illustrative apparatus. Apparatus embodiments may include features that are neither shown nor described in connection with illustrative apparatus. Features of illustrative apparatus embodiments may be combined. For example, an illustrative apparatus embodiment may include features shown or described in connection with any other illustrative apparatus and/or method embodiment described herein.

FIG. 1 shows illustrative machine-readable code 100. MRC 100 includes data zone 101. Data zone 101 includes light and dark modules that encode executable instructions. MRC 100 includes alignment marker 103. Alignment marker 103 is defined by an outer border that includes light and dark modules, an inner border of light modules and a dark module in the center.

MRC 100 also includes position markers 105, 109 and 115. Position marker 105 is in a top-right corner of data zone 101. Position marker 105 includes an outer square-shaped border of dark modules and an inner border of light modules surrounding diamond-shaped core 106 of dark modules. Position marker 109 is in a top-left corner of data zone 101. Position marker 109 includes an outer circular-shaped border of dark modules and an inner border of light modules surrounding diamond-shaped core 108 of dark modules.

Position marker 115 is in a bottom-left corner of data zone 101. Position marker 115 includes an outer shaped border that includes three lines of dark modules. Position marker 115 includes a FLOWCODE logo as part of the outer border. Position marker 115 includes an inner border of light modules surrounding square-shaped core 116 of dark modules.

MRC 100 includes environmental zone 113. Environmental zone 113 includes modules that are not interpreted when MRC 100 is scanned. Environmental zone 113 may include all parts of MRC 100 outside of data zone 101. Environmental zone 113 has been constructed such that it has an appearance that, to a human eye, seems contiguous with the modules of data zone 101. Environmental zone 113 may be constructed such that it does not interfere with the scanning of data zone 101. Environmental zone 113 includes buffer 111. Buffer 111 includes light modules that space data zone 101 apart from modules of environmental zone 113. MRC 100 includes circular border 107. Border 107 may be included in environmental zone 113.

MRC 100 may be displayed on a screen. A viewer may scan MRC 100 using a scanning device such as a mobile device. Data zone 101 may encode any suitable information such as a uniform resource locator ("URL"), link to a social media profile, contact information associated with a business or other alphanumeric information. Data zone 101 may encode instructions, that when scanned, trigger the scanning device to perform a target action or function. The information encoded in data zone 101 may be captured or read by a native application or a third-party application running on the scanning device.

Data zone 101 may conform to an encoding specification for a Quick Response ("QR") code. MRCs described in connection with this disclosure may be any suitable scannable machine-readable code. Other illustrative machine-readable codes include any suitable linear or two-dimensional matrix barcodes, such as Aztec code, ShotCode, SPARQCode, and the like. Other illustrative machine-readable codes include any suitable one dimensional or three-dimensional machine-readable codes.

Data zone 101 may encode a set of instructions that may be repeatedly scanned by multiple viewers and/or scanning devices. For example, MRC 100 may be printed on multiple electronic tags. Each of scan of MRC 100 may capture the identical information from data zone 101. Even though each scanning device may capture the same information from data zone 101, the particular content that is presented on a scanning device may be dynamically customized based on a scan location, scan time, scanning device type or any other suitable scan event detail.

Figure 2:
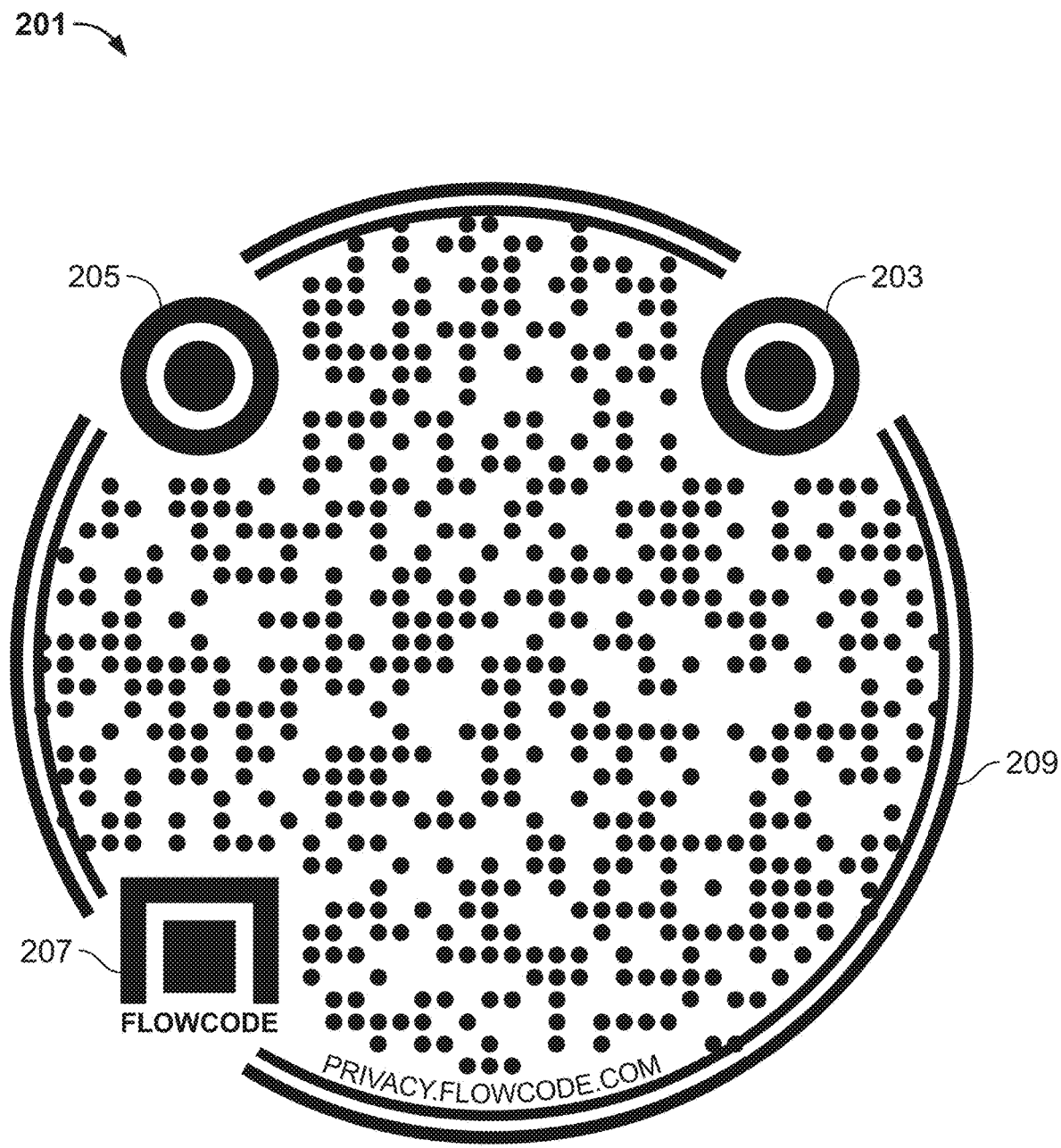
FIG. 2 shows an illustrative machine-readable code in accordance with principles of the disclosure.

FIG. 2 shows illustrative MRC 201. MRC 201 is optimized for scan recognition when displayed electronically. For example, when displayed electronically, MRC 201 may be reliably scannable by a greater number of scanning devices compared to MRC 100 (shown in FIG. 1). A benchmark level of scan reliability may be defined as capturing information encoded in a data zone of an MRC within a threshold time (e.g., 100 milliseconds) by a threshold number of scanning devices (e.g., Android and iOS devices). Electronically displaying MRC 201 may include presenting MRC 201 on a screen, using a light source, holographically or any other electronic presentation.

To optimize scan-ability when MRC 201 is presented electronically, outer border 209 includes breaks at position markers 203, 205 and 207. To optimize scan-ability when MRC 201 is presented electronically, one or more of position markers 203, 205 and 207 may protrude beyond outer border 209. MRC 201 may include a data zone that conforms to an encoding specification for a Quick Response ("QR") code or any other suitable linear or two-dimensional matrix barcodes, such as Aztec code, ShotCode, SPARQCode, and the like.

Figure 3:
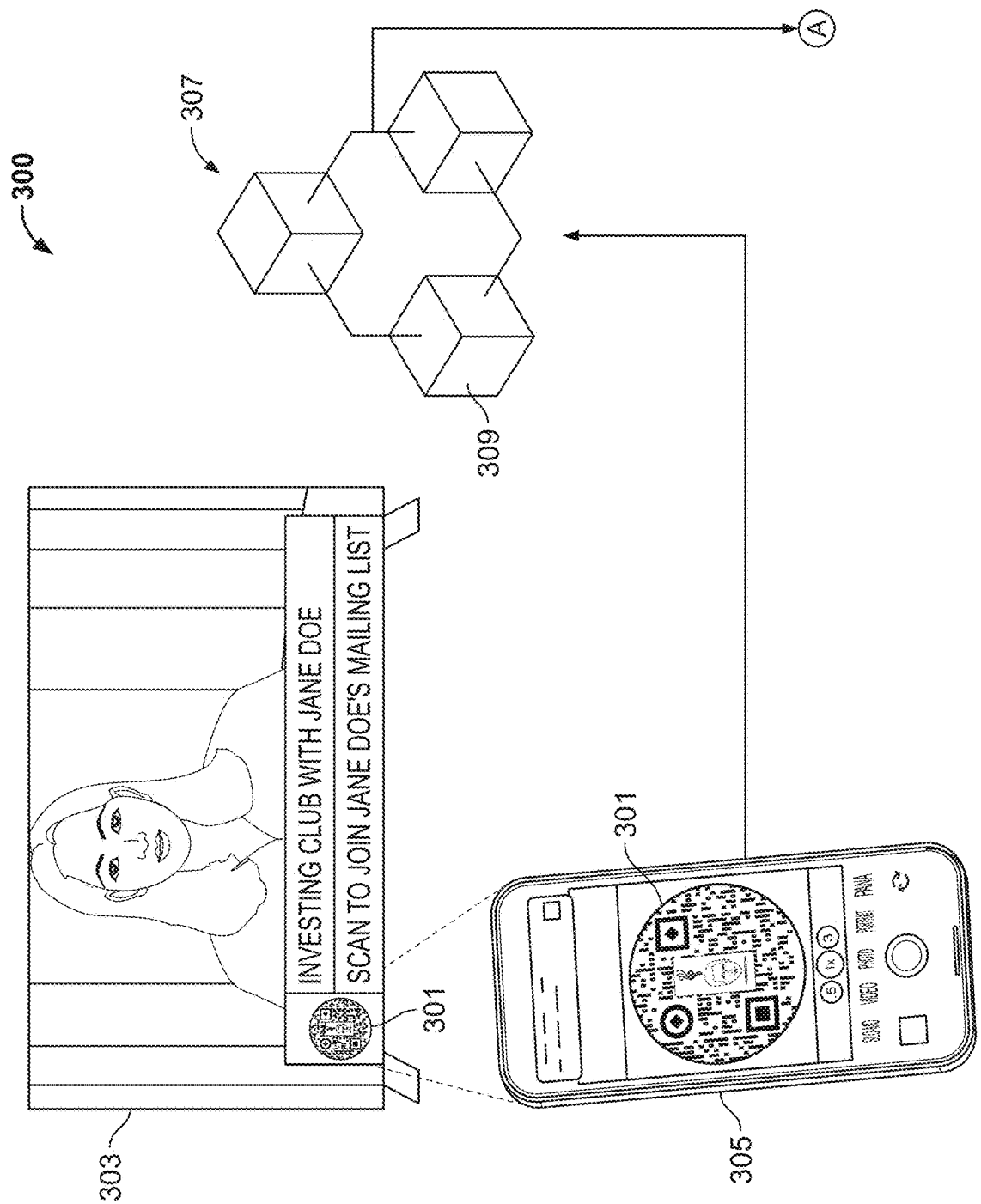
FIG. 3 shows an illustrative system and process in accordance with principles of the disclosure.
Figure 3:
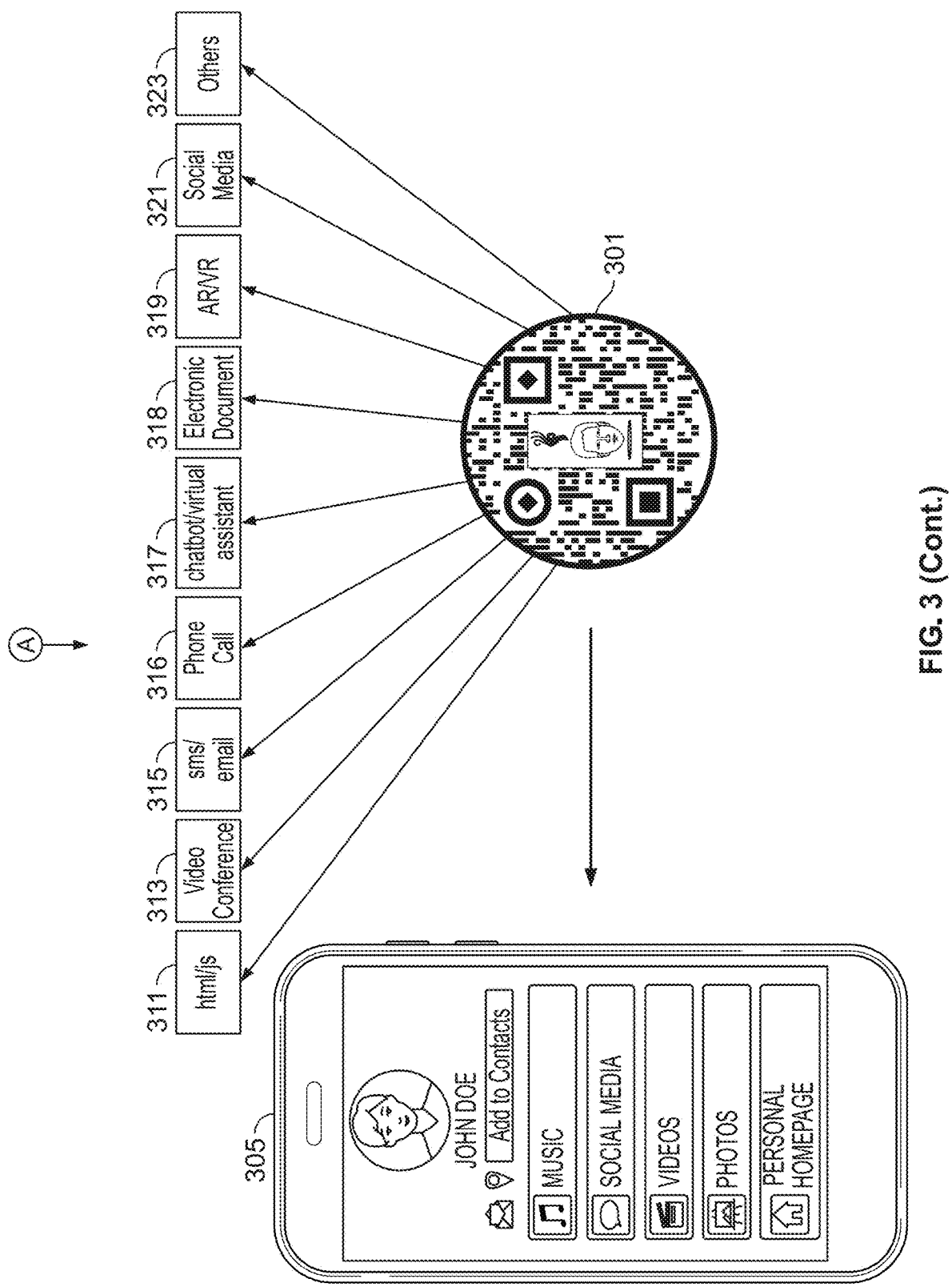

FIG. 3 shows illustrative process 300. MRC 301 is presented within electronic content 303. A user scans MRC 301 using scanning device 305. In some embodiments, scanning device 305 may include software that validates MRC 301 before taking action based on the instructions encoded in MRC 301. In some embodiments, validation of MRC 301 may be performed by software hosted on a remote computer system.

FIG. 3 shows that validation of MRC 301 includes determining whether a code record corresponding to MRC 301 is stored on distributed ledger 307. This validation method may require online access to distributed ledger 307. A corresponding code record may include an owner of MRC 301, instructions encoded in MRC 301 and any other suitable information related to MRC 301.

In some embodiments, validation of MRC 301 may include authenticating a digital signature included in MRC 301. Authenticating a digital signature may include confirming that the digital signature was creating using a cryptographic key associated with a trusted entity. This verification method may be performed locally on scanning device 305 without accessing distributed ledger 307. For example, a digital wallet or other app on scanning device may store a public cryptographic key needed to verify the digital signature.

A digital signature may be included in any suitable zone of MRC 301. For example, the digital signature may be included in a data zone of MRC 301. Including the digital signature in the data zone may increase module density of the data zone. A digital signature may be included in what is conventionally referred to as an environmental zone of MRC 301 (e.g., zones 113 or 107 shown in FIG. 1).

After validating MRC 301, scanning device 305 may process instructions encoded in MRC 301. The encoded instructions may be processed by a redirect system. An illustrative redirect system is described in U.S. Pat. No. 11,120,095, titled "Refactoring of Static Machine-Readable Codes" and issued on Sep. 14, 2021, which is hereby incorporated by reference herein in its entirety.

The redirect system may determine content or services to load on scanning device 305 based on the instructions encoded in MRC 301. The redirect system may formulate content or services to load on scanning device 305 based on one or more scan event details captured in connection with the scan of MRC 301 by scanning device 305. Illustrative scan event details may include a scan time, scan location, weather at the scan time, user physiological characteristics, (fingerprint, facial scan, heart rate) and user demographic information. Scan event details may be determined by scanning device 305. For example, in conjunction with scanning MRC 301, scanning device 305 may capture a timestamp, a GPS location and a user facial scan.

FIG. 3 also shows illustrative content and services that may be loaded on scanning device 305 in response to scanning MRC 301. Illustrative content and services include presenting webpage 311 (e.g., created with HTML or JavaScript), initiating video conference services 313, initiating SMS or email services 315, initiating telephony services 316, initiating chatbot or virtual assistant services 317, provisioning access to electronic document(s) 318, presenting virtual reality (VR) or augmented reality (AR) content 319, opening social media portals (e.g., Twitter, Facebook, Snapchat, Instagram, etc.) 321 and initiating other services and/or content 323.

FIG. 4 shows illustrative code record 401. Code record 401 may correspond to MRC 301 (shown in FIG. 3). In some embodiments, code record 401 may be encapsulated within encryption container 403. Encryption container 403 may secure contents of code record 401 on a public or nonpermissioned distributed ledger. Encryption container 403 may be created by hashing contents of code record 401 (e.g., instructions encoded in MRC 301) and encrypting the resulting hash output using a private cryptographic key associated with the owner of MRC 301. A scanned MRC that includes instructions that are different from the instructions stored in code record 401 (e.g., possible malware) will result in a different hash output.

Alternatively, encryption container 403 may be created by encrypting contents of code record 401 with a public cryptographic key of a trusted entity. An illustrative trusted entity may include an owner of MRC 301, a redirect system or a trusted node that operates on distributed ledger 307. The trusted entity may control a private cryptographic key. The private cryptographic key may be paired to the public cryptographic key that created encryption container 403. Only the trusted entity that controls the paired private cryptographic key can decrypt and read code record 401.

Code record 401 includes code record ID 405. Code record ID 405 may be a hash output. The hash output may depend not only on the contents of code record 401 but also on other records stored in distributed ledger 307. Code record 401 includes information encoded in a data zone of the corresponding MRC. Code record 401 shows that the MRC corresponding to code record 401 encodes the web address "www.flowcode.com/301" in its data zone.

Code record 401 also includes MRC signature 409. MRC signature 409 may link MRC 301 to code record 401. MRC signature 409 may be a public cryptographic key. MRC 301 may encode MRC signature 409. MRC signature 409 may be used to decrypt code record 401. MRC 301 may encode a digital signature created using a private cryptographic key paired to MRC signature 409. MRC signature 409 may be used to authenticate or decrypt the digital signature included in MRC 301.

Code record 401 includes expiration date 411. After expiration date 411, code record 401 may not be used to validate MRC 301. To validate MRC 301 after expiration date 411, a new code record must be located.

FIG. 5 shows illustrative code signature record 501. In some embodiments, code signature record 501 may be linked to code record 401. The link between code signature record 501 and code record 401 may allow MRC 301 to be associated with the issuing entity 509 (e.g., Cup O Coffee) until expiration date 511. After expiration date 511, a new code signature record may be created that lists a different issuing entity. The different issuing entity may then be associated with MRC 301 and code record 401. Thus, MRC 301 may be associated with a first entity until expiration date 511 and a second entity after expiration date 511. In some embodiments, code record 401 may include issuing entity field 509.

FIG. 6 shows illustrative user records 601 and 619. User records 601 and 619 may store user information. User records 601 and 619 may be stored on distributed ledger 307. User record 601 may be encapsulated within encryption container 603 and user record may be encapsulated within encryption container 621. An encryption container may secure contents of a user record.

The encryption container may be created by hashing contents of a user record and encrypting the resulting hash output using a public cryptographic key. The public cryptographic key may be paired to a private cryptographic key. The paired private cryptographic key may be controlled by a trusted node that operates on distributed ledger 307. The trusted node may use the paired private cryptographic key to authenticate, decrypt and read the contents of any user records encrypted using the paired public cryptographic key.

Dapps paired to a user's digital wallet may add and delete user records. Adding a user record may correspond to a user "opting-in" to share user information (email, name, etc) referenced in a user record with an MRC owner. For example, user records 601 and 619 both include public MRC signature 607. Public MRC signature 607 identifies an MRC owner that is authorized to access user information 609 and 627 referenced in user records 601 and 619.

User record 601 shows that for the user corresponding to user ID 605, the MRC owner corresponding to public MRC signature 607 is authorized to access an email address, phone number, data analytics and link to the user's digital wallet to a dapp. A link to the dapp may be included in a scanned MRC (e.g., MRC 301) distributed by the MRC owner. Data analytics may include performance metrics such as scanning activity of a user or user interaction (e.g., click) with content presented on scanning device in response to a scan. User record 601 shows that the MRC owner is not allowed to access an address or share any data elements with a third party.

Each time the user corresponding to user ID 605 scans an MRC that is owned or otherwise associated with public MRC signature 607, user information 627 may be shared with the MRC owner. After the user corresponding to user ID 605 deletes user record 601, user information 609 will not be shared with the MRC owner corresponding to public MRC signature 607. The user corresponding to user ID 605 may add multiple user records that each reference a different MRC owner. The user corresponding to user ID 605 may add multiple user records that all reference the same MRC owner.

User record 619 shows that for the user corresponding to user ID 623, the MRC owner corresponding to public MRC signature 607 is authorized to access data analytics and link a dapp to the user's digital wallet. User record 619 shows that the MRC owner is not allowed to access an email address, phone number, home address or share any data elements with a third party. Each time a user scans an MRC that is owned or otherwise associated with public MRC signature 607, user information 627 may be shared with the MRC owner. After a user deletes user record 619, the MRC owner will not have access to user information 627.

FIG. 6 shows that user records 601 and 619 only lists categories of shareable user information. However, user records 601 and 619 do not include the underlying data elements that will be shared with the MRC owner corresponding to public MRC signature 607. The underlying data elements may not be stored in a user record or on distributed ledger 307. Rather, a trusted node that operates on distributed ledger 307 may fetch the underlying data elements and pass those data elements to a redirect system. The redirect system may formulate content or services loaded on scanning device in response to a scan of MRC 301. The trusted node may be operated by the redirect system.

In some embodiments, the underlying data elements may be stored in a user record. For example, a user record may be encrypted (e.g., using encryption container 603) which prevents unauthorized access to the underlying data elements stored in the user record.

Figure 7:
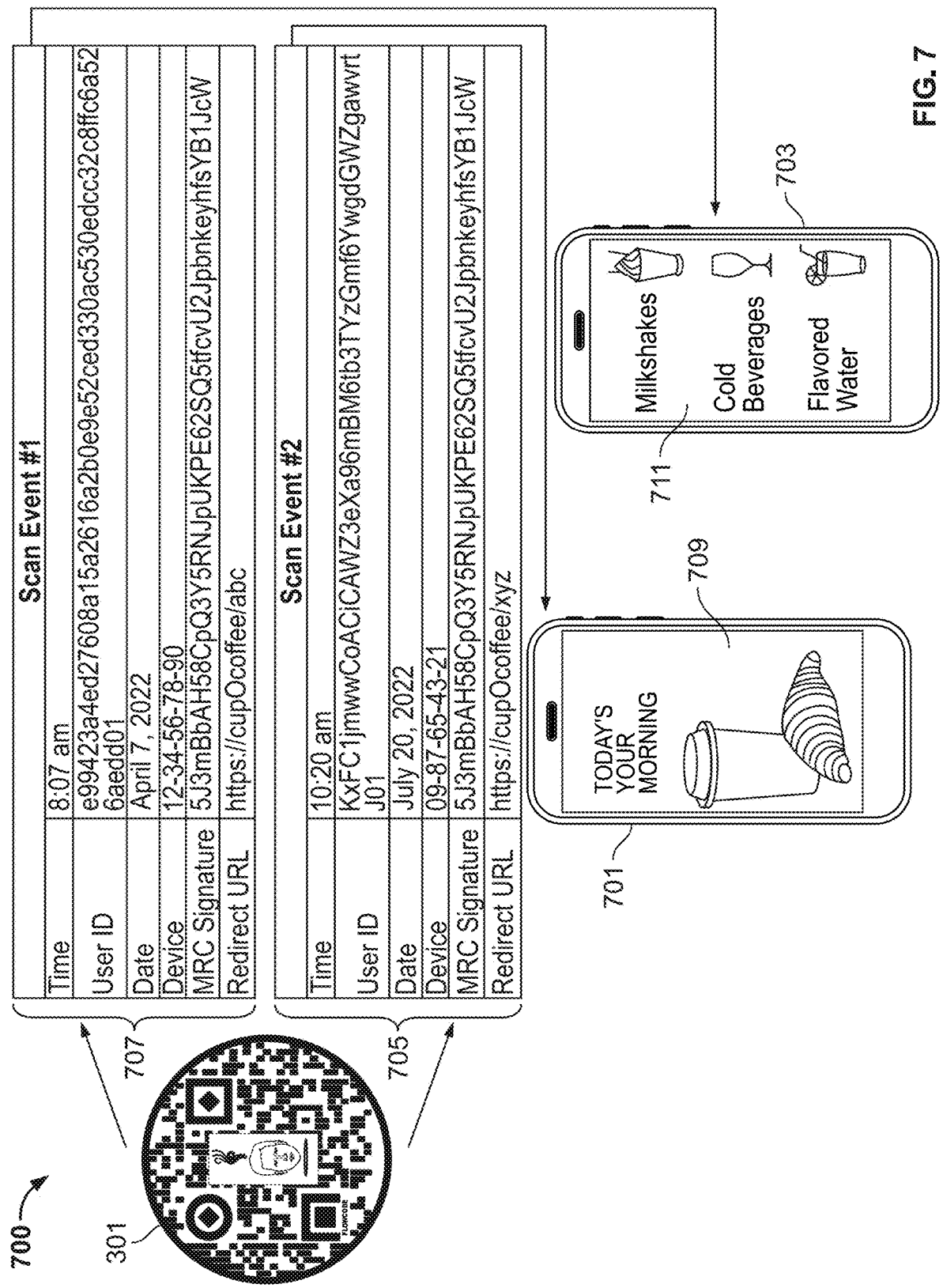
FIG. 7 shows an illustrative process in accordance with principles of the disclosure.

FIG. 7 shows illustrative scenario 700. In scenario 700, a first user, corresponding to user ID 605 (shown in FIG. 6) scans MRC 301 that includes digital signature 409 (shown in FIG. 4) on Apr. 7, 2022 at 8:07 am using a scanning device having identifier 12-34-56-78-90. Scanning device identifier may correspond to a media access control ("MAC") address, international mobile equipment identity ("IMEI") or any other unique identifier of scanning device 703.

Scenario 700 shows that in response to scan event #1, scanning device 703 is redirected to URL "https://cupOcoffee/abc." The redirect URL may be determined by a redirect system based on one or more scan event details captured in conjunction with scan event #1. Scenario 700 shows that the redirect URL formulated in response to scan event #1 may cause content 711 to be presented on scanning device 703. The redirect URL for scan event #1 may be different from a URL encoded in scanned MRC 301.

In scenario 700, a second user, corresponding to user ID 623 (shown in FIG. 6) scans MRC 301 that includes digital signature 409 (shown in FIG. 4) on Jul. 20, 2022 at 10:20 am using a scanning device having identifier 09-87-65-43-21. A scanning device identifier may correspond to a media access control ("MAC") address, international mobile equipment identity ("IMEI") or any other unique identifier of scanning device 701.

Scenario 700 shows that in response to scan event #2, scanning device 701 is redirected to URL "https://cupOcoffee/xyz." The redirect URL may be determined by a redirect system based on one or more scan event details captured in conjunction with scan event #2. Scenario 700 shows that the redirect URL formulated may cause content 709 to be presented on scanning device 701. The redirect URL formulated in response to scan event #2 may be different from a URL encoded in scanned MRC 301.

FIG. 8 shows an illustrative regions of MRC 101 (shown in FIG. 1). Each region of MRC 101 may include a discrete instructions. In some embodiments, first instructions encoded in a first region, when processed in conjunction with second instructions encoded in a second region, may collectively form third instructions.

FIG. 8 shows that MRC 101 includes primary code region 802 and external code regions 806. It should be noted that embodiments according to the invention preferably includes instructions that program a scanning device to read the different code regions of MRC 101. The instructions enable the scanning device to read, interpret and process the instructions encoded in primary region 802 and external regions 806. The scanning device may also be preferably configured to interpret and process the instruction encoded in modules located in rim 808 that bounds the external portion of external code regions 806. The scanning device may also preferably be configured to interpret and process instructions encoded in modules located in square border 810 that (surrounding data zone 802).

It should be noted that, while five code regions are shown in FIG. 8, this number of code regions is merely exemplary, and any other suitable number of code regions is within the scope of this disclosure. In some embodiments, any code region could be either subdivided or encoded with different instructions in the additional region. This flexible adaption of different code regions could preferably be used to take advantage of any suitable MRC encoding format. Each module, or group of modules, could be used multiple times and/or in multiple logic patterns.

In some embodiments, a scanning device may be programmed to interpret and process, preferably simultaneously, instructions encoded in external code regions 806, the instructions encoded in rim 808 and the instructions encoded in square 810. In such embodiments, a scanning device may be programmed to simultaneously read instructions encoded in two or more regions of MRC 101.

Figure 9:
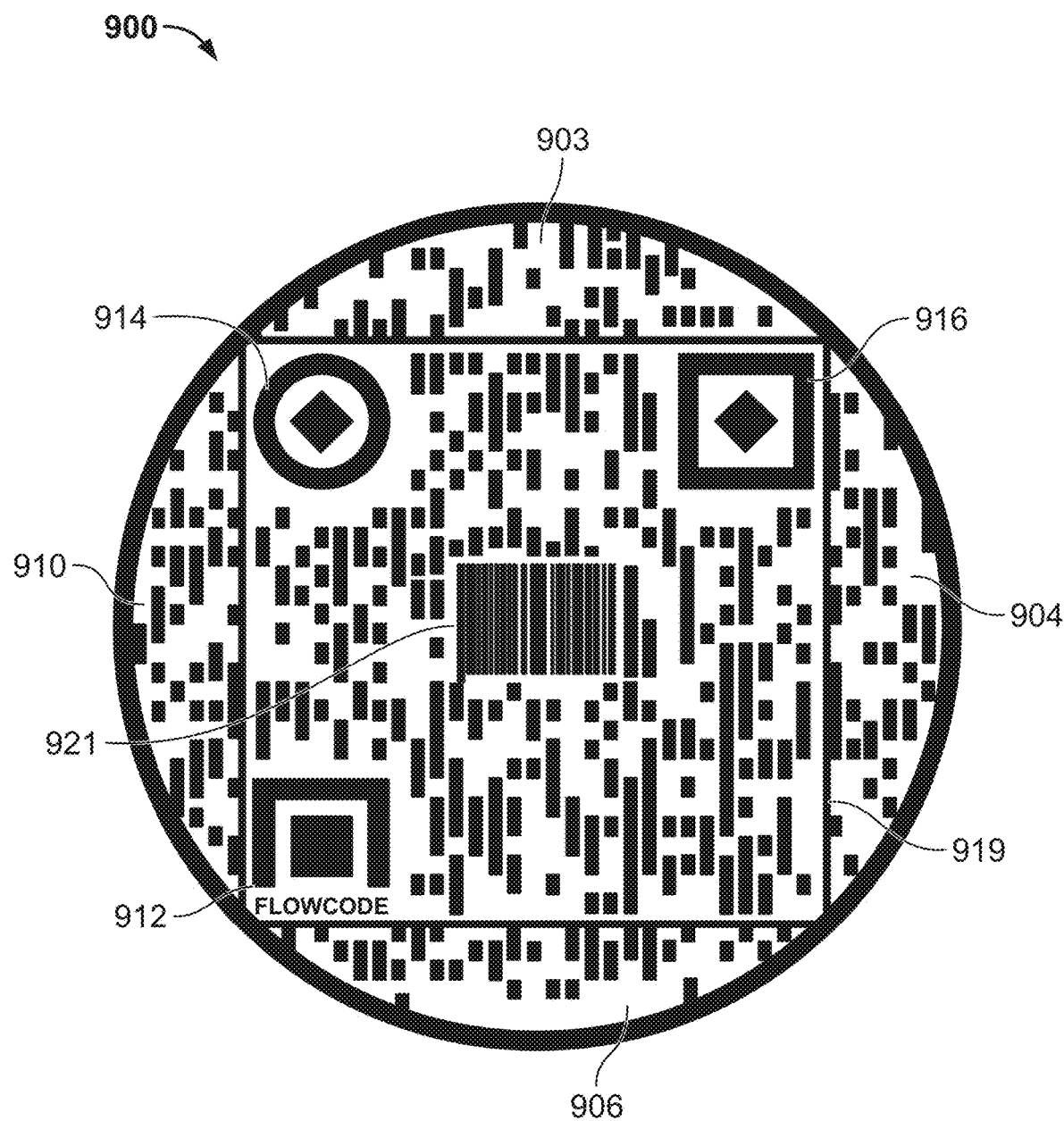
FIG. 9 shows an illustrative machine-readable code in accordance with principles of the disclosure.

FIG. 9 shows another illustrative diagram of MRC 900 in accordance with the principles of the disclosure. MRC 900 includes scannable regions 903, 904, 906 and 910. MRC 900 includes orientation markers 912, 914, and 916. It should be noted that these orientation markers are optional and not required in all embodiments. MRC 900 also includes an internal code region 921 that utilizes different a modular pattern than other regions of MRC 900.

Code region 921 is shown having a modular pattern associated with a linear barcode or a two-dimensional matrix barcode. However, code region 921 may include any suitable machine-readable pattern. For example, code region 921 may include a modular pattern associated with linear or two-dimensional matrix barcodes, such as Aztec code, ShotCode, SPARQCode, and the like. Code region 921 may include a modular pattern associated with a three-dimensional machine-readable code or a machine-readable image.

Code region 921 may encode a digital signature. The digital signature may preferably enable a scanning device or other systems to determine whether the scanned MRC was generated by a pre-determined entity. In some embodiments, a scanning device or other system may be programmed to only process instructions encoded in MRC generated by a trusted pre-determined entity.

It should be noted that the size of internal region 921 may be limited by the error correction level of MRC 900 at least because the space available for instructions to be encoded in primary scanning region 919 may be limited by the inclusion therein of internal code region 921. It should be noted as well that a unique modular pattern (shown only with respect to internal region 921) may also, in certain embodiments, be used to fill external regions 903, 904, 906 and 910 with encoded instructions.

MRC 900 may include a digital signature. For example, the digital signature may be encoded in region 921. The digital signature can preferably include information identifying an owner of MRC 900 or a trusted node responsible for verifying authenticity of MRC 900. The digital signature be used by a scanning device includes a verification application. A scanning device that includes the verification application may verify, before processing instructions encoded in MRC 900, the identity of the owner of MRC 900.

One method of confirming a digital signature embedded in an MRC involves using cryptographic key. For example, an MRC generator may generate the digital signature based on a private cryptographic key. This embedded private key may be the unique signature of the MRC. An illustrative MRC generator is described in U.S. Pat. No. 11,010,650, entitled "Machine-Readable Label Generator," issued on May 18, 2021 and incorporated by reference herein in its entirety.

The digital signature included in MRC 900 may be readable by a scanning device. For example, the scanning device may scan MRC 900. A verification application may be downloaded to, or resident on, a scanning device. The verification application may include a public cryptographic key. The public cryptographic key may include a 32-byte key. The public cryptographic key may be stored in a digital wallet installed on the scanning device.

The verification application may be customized at least because it includes the public cryptographic key. The public cryptographic key may be used to validate the digital signature encoded within MRC 900 and thereby confirm that MRC 900 has been issued by a trusted entity. Confirming that MRC 900 has been issued by a trusted entity may reduce a risk that the scanning device will process an MRC that includes malware. It should be noted that applications for scanning MRC that include a digital signature may preferably be configured to transmit the information encoded in the MRC, the scan time, the scan location and/or other contextual information associated with an MRC scan—to a centralized server. The centralized server may be part of a redirect system. At the centralized server, the transmitted information may preferably be indexed and analyzed to determine trends involving user's behavior. Such retrieval, consolidation and analysis of scanning information should all preferably comply with relevant information privacy regulations and user privacy settings (e.g., as determined by user information in one or more user records).

Figure 10:
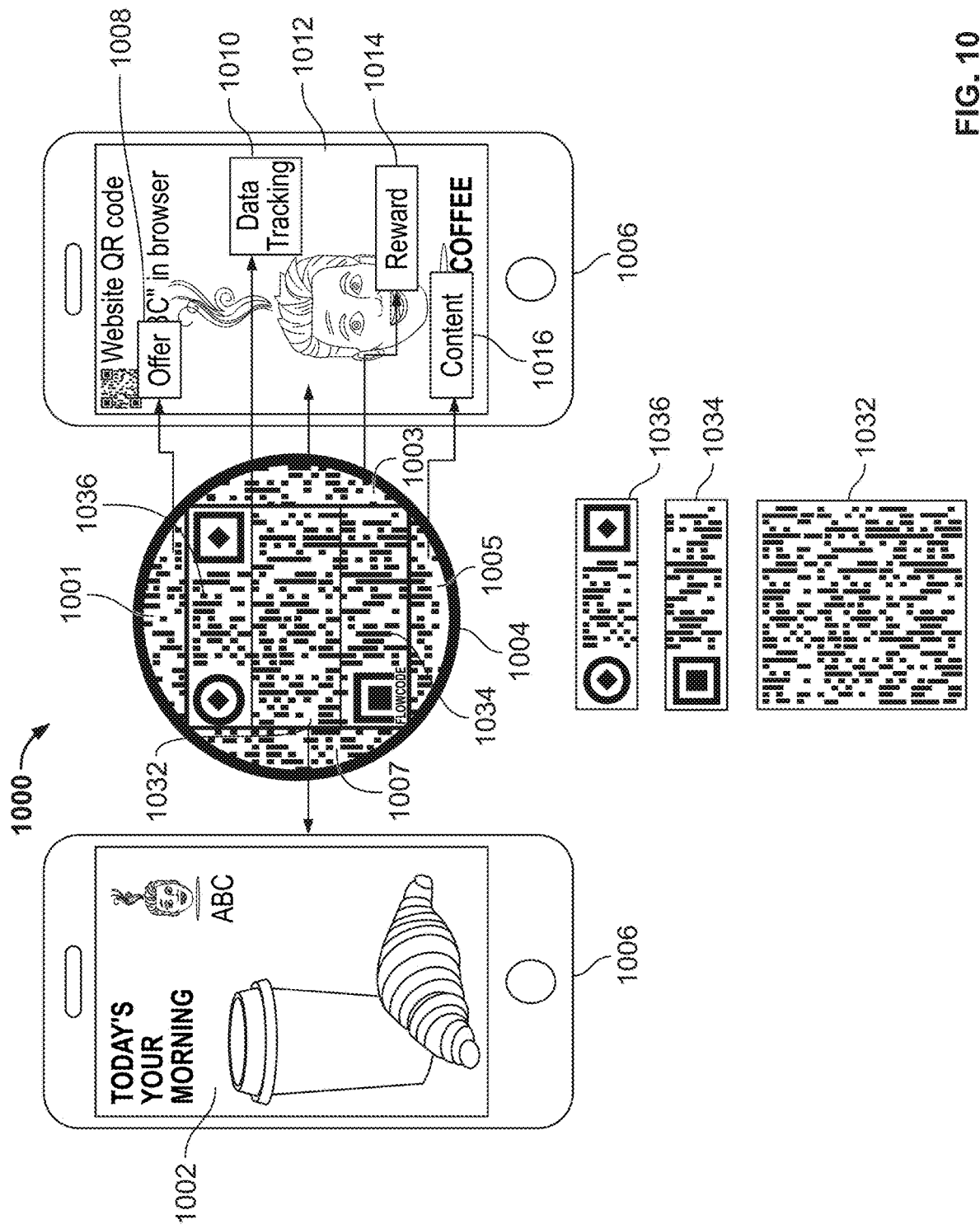
FIG. 10 shows illustrative components of a machine-readable code and an associated scenario in accordance with principles of the disclosure.

FIG. 10 shows how different code regions of MRC 101 (shown in FIG. 1) may be processed by illustrative scanning devices 1002 and 1006. Code region 1001 of MRC 101 may preferably provide instructions related to offer 1008 displayed when webpage 1012 is presented on scanning device 1006. Code region 1003 may preferably provide instructions related to reward 1014 displayed when webpage 1012 is presented on scanning device 1006. Code region 1005 may preferably provide instructions related to content 1016 displayed when webpage 1012 is presented on scanning device 1006. Code region 1007 may track user activity on webpage 1012. Code region 1007 may embed a tracking pixel or other code into webpage 1012. The tracking pixel or other code may capture activity of the user on webpage 1012. User analytics and other performance metrics may be generated based on tracking user activity on webpage 1012.

FIG. 10 also shows that scannable code regions of MRC 101 may include rim 1004 and/or internal region 1032. To the extent that internal region 1032 is scannable independently of other code regions, when scanned alone, internal code region 1032 may trigger a loading of webpage 1002 or other content that is different from webpage 1012.

FIG. 10 also shows that internal code region 1032 may be subdivided into different scannable code regions. FIG. 10 shows that internal code region 1032 include code subregions 1036 and 1034. Each of code subregions 1036 and 1034 may scannable independently of internal code region 1032. One or more of code regions 1036, 1034 and 1032 may encode a digital signature. A scanning device may be configured to verify the digital signature before processing any instructions encoded in MRC 101. Verifying the digital signature may confirm that the instructions encoded in MRC 101 do not include malware.

Code regions of MRC 101 may be processed stagewise. Stagewise processing of code regions may include, in a first stage, initiating uploading instructions extracted from a first code region to a scanning device. In a second stage, the processing may include determining whether a second code region includes a valid digital signature. After verifying the digital signature, a third stage may include enabling executing the instructions extracted from the first region of the scanned MRC.

Figure 11:
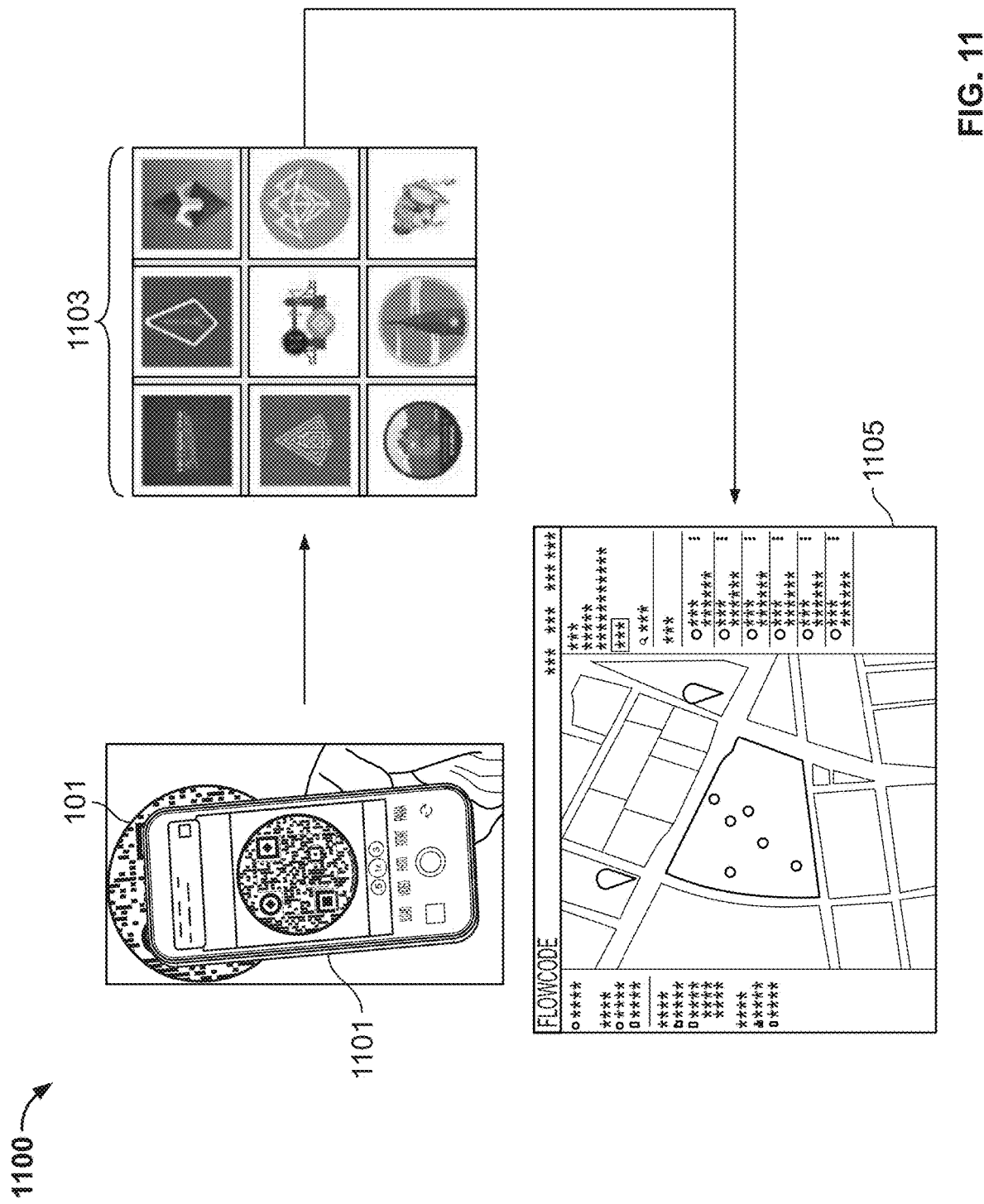
FIG. 11 shows illustrative functionality of a software tool in accordance with principles of the disclosure.

FIG. 11 shows illustrative process 1100 for using MRC 101 to distribute NFTs. Process 1100 begins when a user scans MRC 101 using scanning device 1101. A code region of MRC 101 may include instructions that links a digital wallet to a dapp. The dapp may be configured to distribute one or more of NFTs 1103 to credentials stored in the linked digital wallet. The digital wallet may be installed on scanning device 1101.

After one or more of NFTs 1103 are associated with credentials stored in the digital wallet, an NFT creator can link promotional items such as coupons and discounts with the distributed NFT. Any digital wallet that is associated with the credentials the evidence ownership of the distributed NFTs can also obtain access to the coupons and discounts.

Scanning MRC 101 and triggering distribution of an NFT to a digital wallet may also be used in connection with Proof of Attendance Protocol ("POAP"). POAP is a platform and infrastructure that enables creation and storage digital records such as NFTs, that may be distributed as digital proof of attendance or participation in a physical or virtual event. By default, NFTs distributed via POAP are minted on Gnosis Chain, an Ethereum-based sidechain that uses a proof-of-stake consensus mechanism.

NFTs distributed via POAP act as an attestation of interaction between the NFT issuer and the attendee. NFTs distributed via POAP may also be used to control access to content and communication channels, engage attendees in collaborative initiatives and various other applications. An MRC may be encoded with instructions that link to the POAP platform and associated infrastructure. Scan event details, such as scan location and time stamp, may be used to confirm attendance at a specific venue at a specific time.

FIG. 11 also shows that scan event details may be used to build NFT distribution map 1105. NFT distribution map 1105 shows of physical or virtual locations (e.g., within a metaverse) where a user has scanned an MRC and collected an NFT. Different promotional items may be associated with the collected NFTs depending on the scan event details captured in conjunction with the MRC scan that triggered distribution of the collected NFT. For example, promotional items may be time based and location based.

Figure 12:
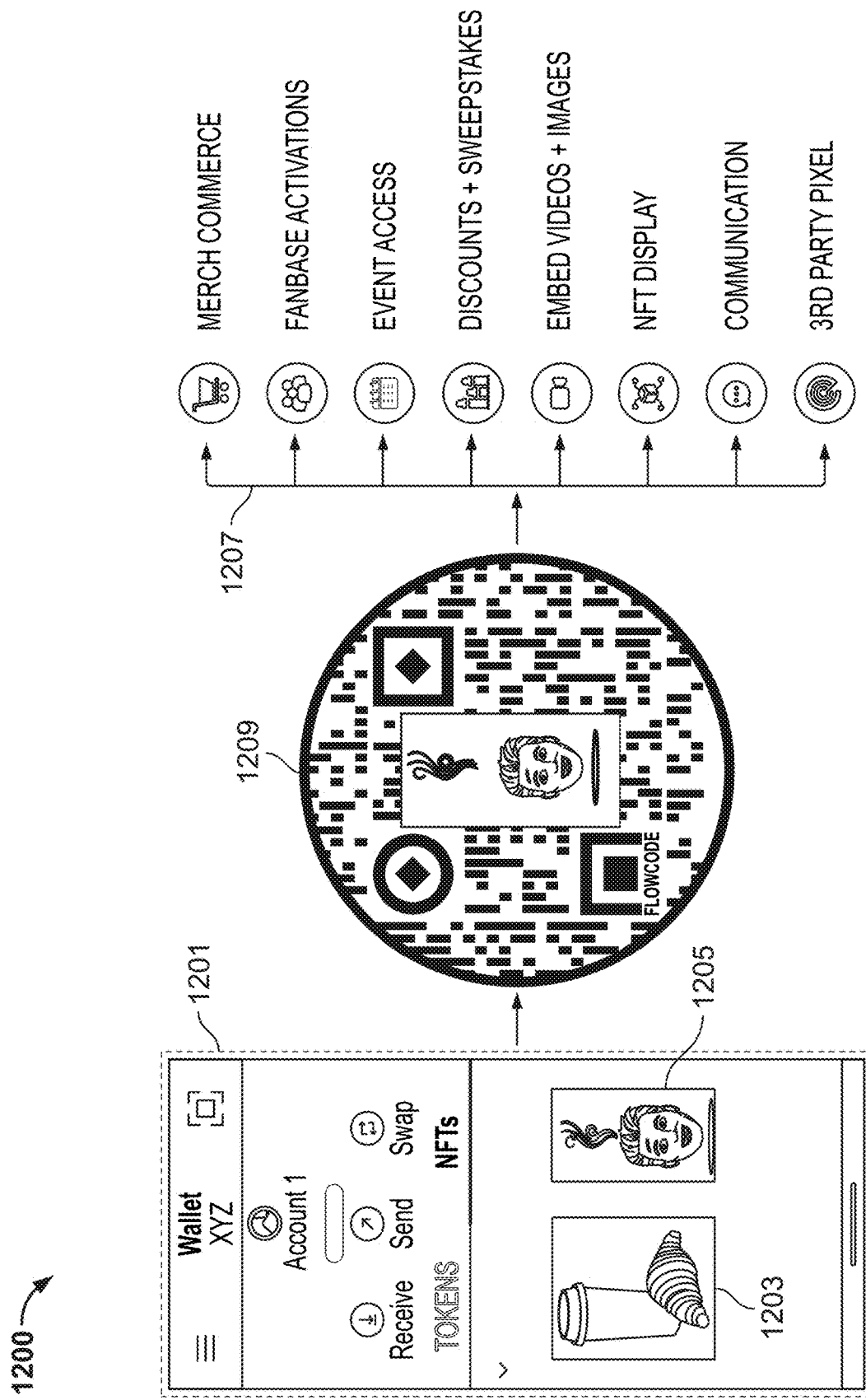
FIG. 12 shows illustrative functions of a software tool in accordance with principles of the disclosure.

FIG. 12 shows illustrative process 1200. Process 1200 shows that digital wallet 1201 includes credentials that evidence ownership of NFTs 1203 and 1205. A scanning device associated with digital wallet 1201 may be used to scan MRC 1209. MRC 1209 may include a digital signature or other instructions that link MRC 1209 to a dapp running on a distributed ledger. A smart contract associated with the dapp may determine whether digital wallet 1201 stores credentials that evidence ownership of NFT 1205. In response to determining that digital wallet 1201 does store credentials that evidence ownership of NFT 1205, the dapp linked to NFT 1205 may provide one or more of services 1207 on the scanning device or for the scanning user.

Figure 13:
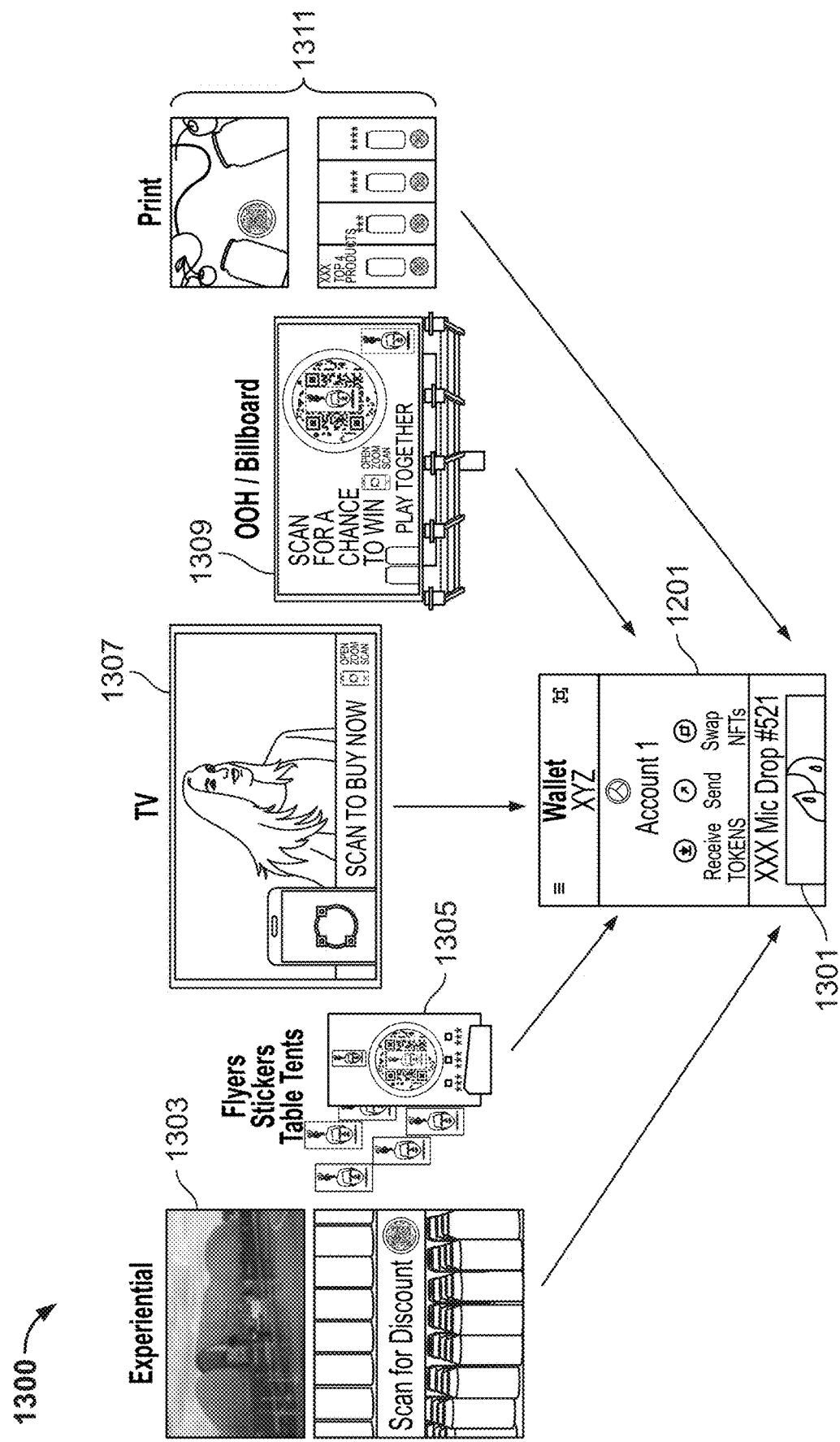
FIG. 13 shows illustrative functions of a software tool in accordance with principles of the disclosure.

FIG. 13 shows illustrative events and venues that may be associated with an MRC. FIG. 13 shows that a scan of the MRC displayed at any of a variety of events or venues may be linked to credentials stored in digital wallet 1201 that evidence ownership of NFT 1301. Illustrative events or venues shown in FIG. 13 include experiential events or items 1303, digital media presentations 1307, advertising items 1309 and print media 1311.

Based on the ownership of NFT 1301, the scanning device may be provided with a service, goods or promotional items. The service, goods or promotional item may be provided to the user at the event or venue. A redirect system may track and analyze scans of the MRCs displayed at the various events or venues. The redirect system may formulate performance metrics associated with the various events or venues.

Illustrative performance metrics may include time users spend on a landing page presented in response to an MRC scan, user engagement with content presented on the landing (interaction with a chatbot or add to cart or other activity available on landing page) and utilization of the service, goods or promotional items provided in response to the MRC scan. Content presented on the scanning device in response to the MRC scan may be changed based on the captured performance metrics. For example, users may be directed to a target landing page that is associated with target performance metrics.

Figure 14:
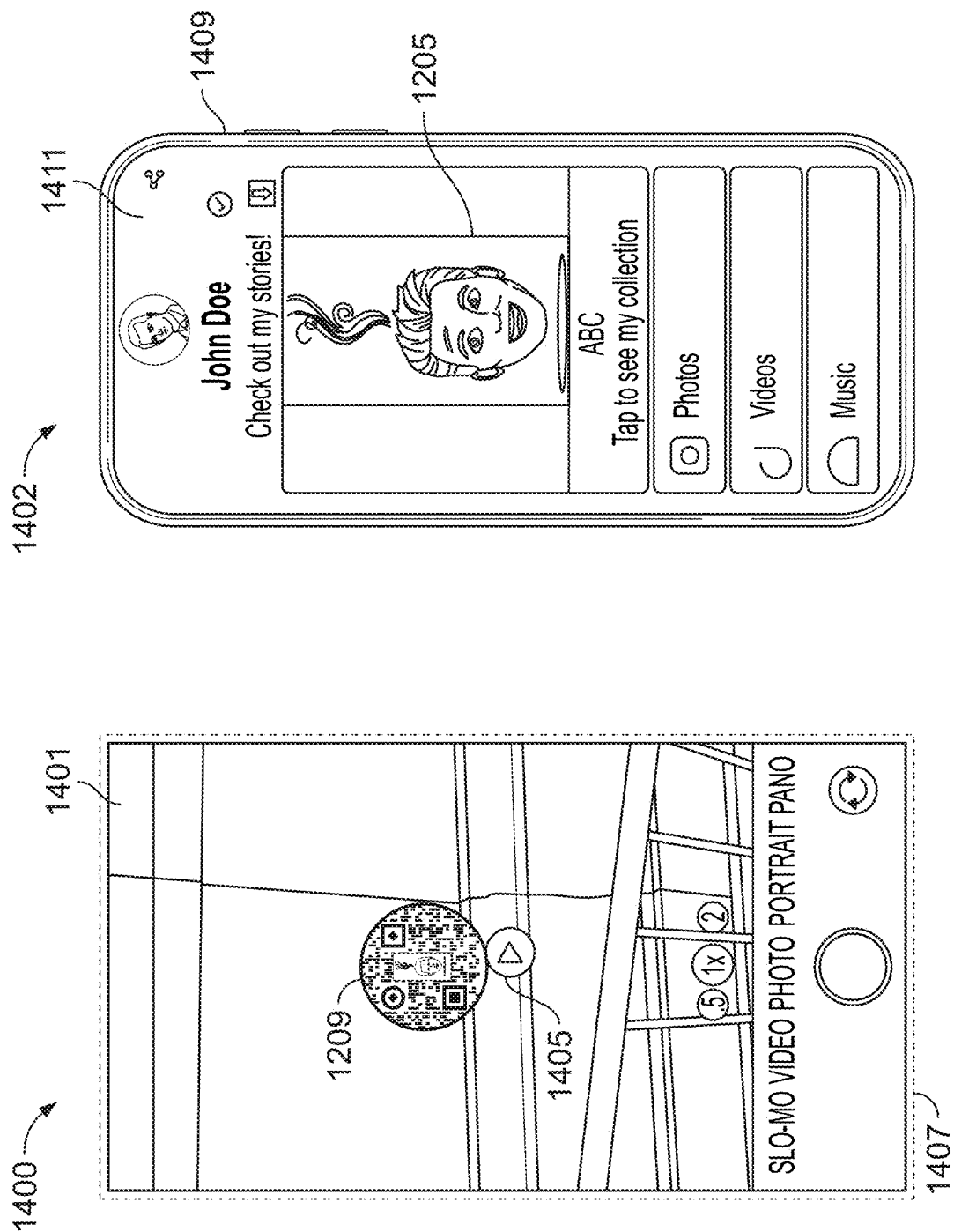
FIG. 14 shows illustrative functions of a software tool in accordance with principles of the disclosure.

FIG. 14 shows illustrative scenarios 1400 and 1402. Scenario 1400 shows MRC 1209 displayed at physical location 1401. Screenshot 1407 shows a user has scanned MRC 1209 and is presented with prompt 1405 to view an augmented reality ("AR") presentation layered on top of physical location 1401. An exemplary AR presentation may show physical location 1401 with a digital augmentation overlay. An app running on a scanning device may be configured to support a variety of AR file types and formats, such as .USDZ and .GLTB.

Scenario 1402 shows that a scan of MRC 1209 may trigger a loading of webpage 1411 on scanning device 1409. MRC 1209 may include instructions that integrate visualization of NFT 1205 into webpage 1411. For example, MRC 1209 may include instructions that link to a location of NFT 1205 on a distributed ledger. Views of NFT 1205 on webpage 1411 may tracked and performance metrics generated based on viewer interaction with content, including NFT 1205, presented on webpage 1411. Any such performance metrics may be correlated to scan event details captured in conjunction with a scan of MRC 1209 that triggered a loading of webpage 1411 on a scanning device.

Figure 15:
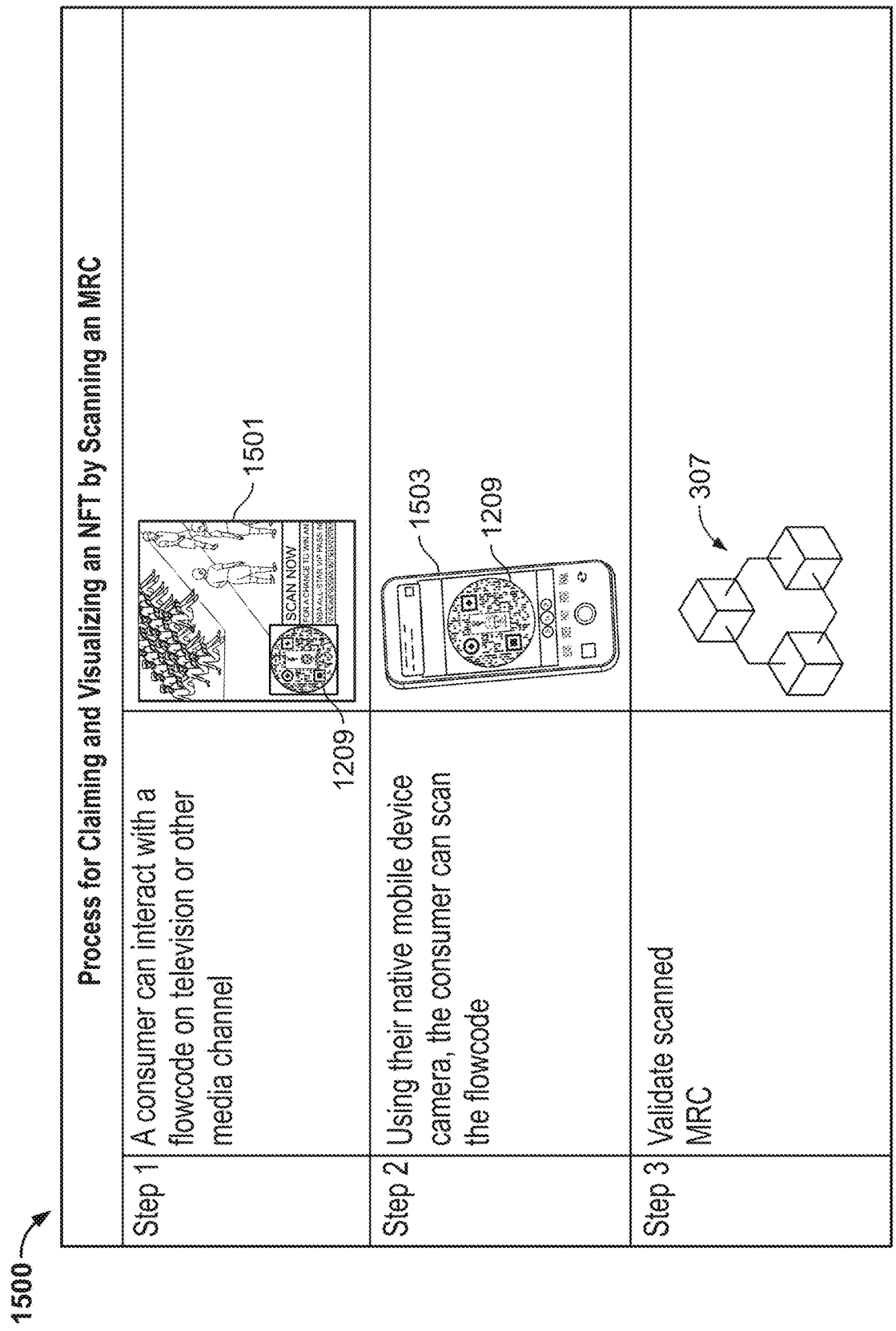
FIG. 15 shows illustrative functions of a software tool in accordance with principles of the disclosure.

FIG. 15 shows illustrative process 1500. Process 1500 begins at step 1. At step 1, a scannable MRC 1209 is displayed. Step 1 shows that MRC 1209 is displayed within electronic content 1501 presented on television or other media channel. At step 2, a viewer scans MRC 1209 using scanning device 1503.

At step 3, after the user scans MRC 1209 and before instructions encoded in MRC 1209 are allowed to trigger any action on scanning device 1503, MRC 1209 is validated. Validating MRC 1209 may include validating a digital signature included in MRC 1209. Validating MRC 1209 may include determining whether a code record corresponding to MRC 1209 is stored on distributed ledger 307.

After validating scanned MRC 1209, at step 4, the instructions encoded in MRC 1209 may link digital wallet 1201 to NFTs 1203 and 1205. NFTs 1203 and 1205 may be stored on distributed ledger 307. Digital wallet 1201 may be installed on scanning device 1503. Digital wallet 1201 may be installed on remote computer system. An interface may be installed on scanning device 1503 for accessing digital wallet 1201 installed on the remote computer system. The instructions encoded in MRC 1209 may trigger digital wallet 1201 to prompt the user of scanning device 1503 to accept ownership of NFTs 1203 and 1205. After accepting ownership of NFTs 1203 and 1205, digital wallet 1201 will store credentials that confirm ownership of NFTs 1203 and 1205.

At step 5, digital wallet 1201 may be linked to a webpage. A dapp or other smart contract may link digital wallet 1201 to the webpage. Creating the link between digital wallet 1201 and the webpage allows the linked webpage to present a visualization of NFTs 1203 and 1205.

Step 6 shows an illustrative view of webpage 1505. Webpage 1505 includes a visualization of NFT 1205. Webpage 1505 also includes other content such as links to music 1511, videos 1509, photos 1507 and a user's personal homepage 1513. Webpage 1505 may include any other suitable content such as links to a user's social media profile(s).

The content and visualization of any NFTs displayed on webpage 1505 may be presented differently for different viewers of webpage 1505. For example, another MRC may encode instructions that redirects a scanning device to webpage 1505. A redirect system may determine a display order (e.g., from top to bottom of screen) for content presented on webpage 1505 based on one or more scan event details captured when the other MRC is scanned. When MRC 1209 is scanned by a specific device type, NFT 1205 may be visualized differently than shown in webpage 1505. A specific visualization of NFT 1205 presented may depend on one or more scan event details.

A redirect system may determine a specific visualization for NFT 1205 based on captured scan event details. For example, when webpage 1505 is viewed during nighttime hours or using a first type of mobile device, a linked NFT may be displayed with a first color scheme or resolution. When webpage 1505 is viewed during daytime hours or using a second type of mobile device, a linked NFT may be displayed with a second color scheme or resolution.

Step 7 shows that ownership of NFTs 1203 and 1205 may be utilized to gain admittance to a restricted venue or event. MRC 201 may be posted at an entrance to the restricted venue or event. Step 7 shows that a user has scanned MRC 201 with scanning device 1503. Step 8 shows that MRC 201 may encode instructions that trigger a dapp to determine whether digital wallet 1201 installed on scanning device 1503 stores credentials that evidence ownership of NFT 1205. At step 8 digital wallet 1201 may prompt the user to accept terms and conditions 1515 associated with access to the restricted venue or event.

At step 9, in response to determining that NFT 1205 is owned by scanning device 1503, access to the restricted venue or event is allowed. Allowing access to the restricted venue or event is allowed may include automatically unlocking an entrance way or other barrier to entry. Screenshot 1517 shows that access to the restricted venue or event may include access to an AR presentation associated with scanned MRC 201 or a specific geographic location.

Figure 16:
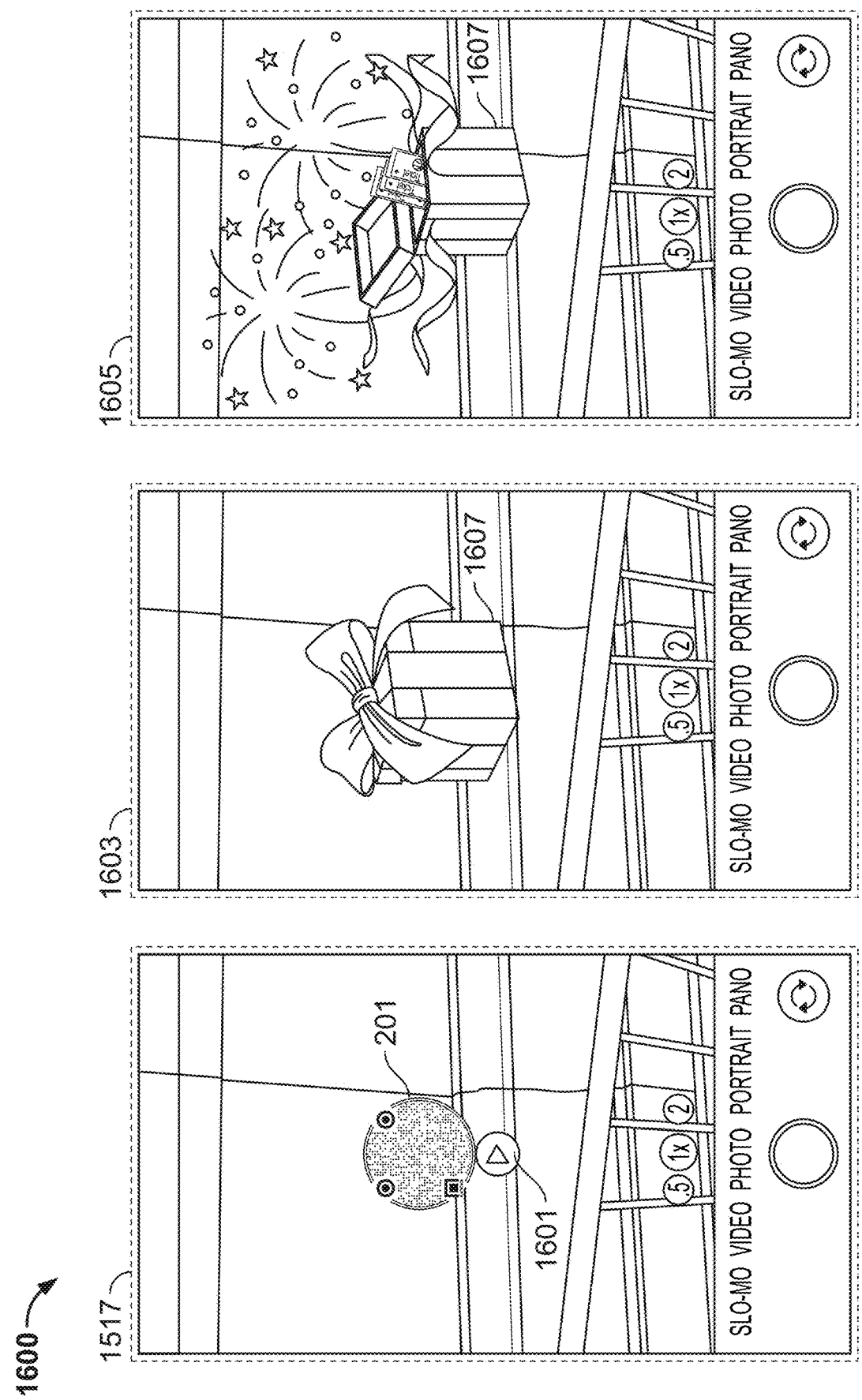
FIG. 16 shows illustrative functions of a software tool in accordance with principles of the disclosure.

FIG. 16 shows illustrative screenshots 1600 associated with an augmented reality presentation triggered in response to scanning MRC 201. Screenshot 1517 shows that scanning device 1503 has captured a scan of MRC 201. As described above in connection with FIG. 15, step 9, in response to determining that an NFT (e.g., NFT 1205) is owned by digital wallet 1201 associated with scanning device 1503, access may be granted to view an AR presentation. Screenshot 1517 shows that a user of scanning device 1503 may click or touch prompt 1601 to play the AR presentation.

Screenshot 1603 shows that the AR presentation may include depiction of present 1607 in a first stage (e.g., closed). Screenshot 1605 shows that the AR presentation may include present 1607 in a second stage (e.g., bursting open). Screenshot 1605 also shows that AR presentation may be used to present a user with additional NFTs, such a tickets to an event or venue. Screenshot 1605 shows that the user is being presented with sporting event tickets 1609. Programming associated with an AR presentation may automatically add credentials demonstrating ownership of sporting event tickets 1609 to digital wallet 1201.

Figure 17:
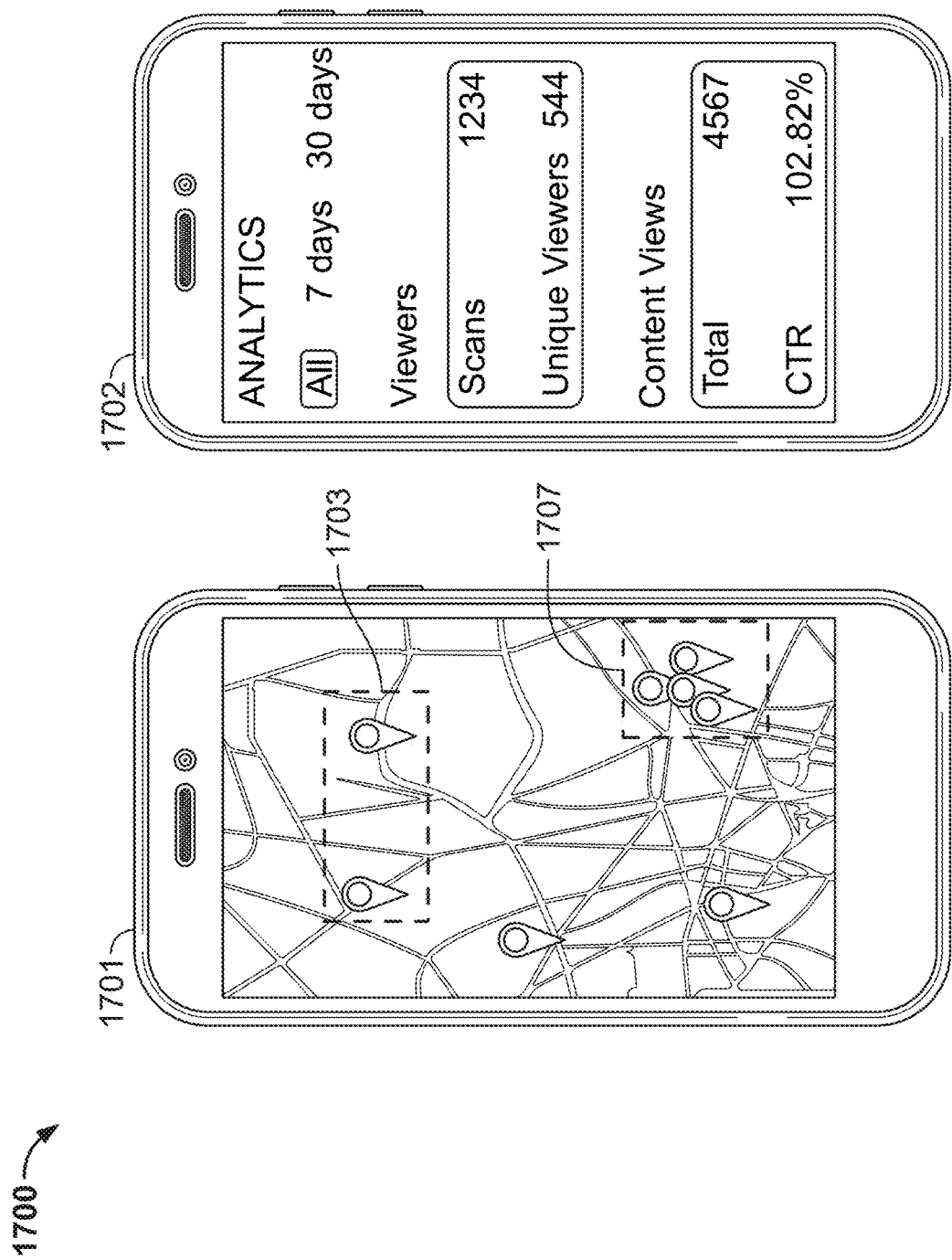
FIG. 17 shows illustrative functions of a software tool in accordance with principles of the disclosure.

FIG. 17 shows illustrative performance metrics 1700 that may be generated based on user activity associated with scanning MRCs.

Screenshot 1701 shows a map of MRCs that have been scanned in different geographical regions. MRCs scans may be correlated to distribution of NFTs in response to scanning an MRC. Screenshot 1701 may represent a map of AR presentations triggered by scanning an MRC or any other suitable action triggered by scanning an MRC.

Screenshot 1701 shows that MRCs within target geographic regions 1707 and/or 1705 may be configured to trigger different actions on different scanning devices. The specific action triggered on a specific scanning device may be determined by a redirect system based on one or more captured scan event details.

Screenshot 1702 shows performance metrics that may be associated with content displayed on a scanning device in response to scanning an MRC. Illustrative content displayed on a scanning device may include webpage 1505. Performance metrics 1700 may be captured based on tracking code embedded in content displayed on a scanning device.

Screenshot 1702 shows performance metrics corresponding to user interaction (measured in clicks or touch points) with webpage 1505 displayed on scanning device 1503 in response to a scan of MRC 201. A redirect system may alter content included in webpage 1505 in response to a scan of MRC 201 based on performance metrics 1703. For example, content displayed on webpage 1505 may be reordered based on generating target performance metrics.

Thus, methods and apparatus for SECURE SCANNING OF MACHINE-READABLE CODES are provided. Persons skilled in the art will appreciate that the present disclosure can be practiced by other than the described embodiments, which are presented for purposes of illustration rather than of limitation, and that the present disclosure is limited only by the claims that follow.

What is claimed is:

1. A non-transitory computer-readable storage medium with an executable program stored thereon, wherein the program instructs a microprocessor to:
   detect a scan of a machine-readable code ("MRC");
   validate a uniform resource locator ("URL") encoded in the MRC;
   in response to successfully validating the URL, link a digital wallet to a decentralized application ("dapp") corresponding to the URL; and
   trigger the dapp to execute a transaction on a distributed ledger using a user cryptographic key stored in the digital wallet.

2. The non-transitory computer-readable storage medium of claim 1 wherein the program further instructs the microprocessor to authenticate the URL by:
   extracting a digital signature from the MRC;
   locating an owner public cryptographic key linked to the URL; and
   using the owner public cryptographic key to determine whether the digital signature has been created using an owner private cryptographic key paired to the owner public cryptographic key.

3. The non-transitory computer-readable storage medium of claim 1 wherein the transaction comprises determining whether the user cryptographic key stored in the digital wallet owns a non-fungible token ("NFT") issued by the user cryptographic key.

4. The non-transitory computer-readable storage medium of claim 3 wherein the program further instructs the microprocessor to:
   in response to determining that the user cryptographic key stored in the digital wallet owns the NFT, linking the NFT to the dapp; and
   in response to the linking of the NFT to the dapp, provide authentication to access a restricted venue.

5. The non-transitory computer-readable storage medium of claim 3 wherein the program further instructs the microprocessor to:
   in response to determining that the user cryptographic key stored in the digital wallet owns the NFT, link the NFT to the dapp; and
   visualize the NFT on a webpage linked to the user cryptographic key stored in the digital wallet.

6. The non-transitory computer-readable storage medium of claim 1 wherein the transaction comprises:
   minting a non-fungible token ("NFT"); and
   assigning ownership of the NFT to the user cryptographic key stored in the digital wallet.

7. A system that secures access of a digital wallet to a distributed application ("dapp"), the system comprising:
   an MRC comprising a data zone that encodes first instructions;
   a digital signature generated based on the first instructions and a private cryptographic key; and
   second instructions stored in a non-transitory memory, the second instructions, when executed by a processor:
   detect a scan of the data zone;
   in response to the scan, determine whether the MRC includes the digital signature;
   when the MRC includes the digital signature, link the digital wallet to the dapp using the first instructions; and
   when the MRC does not include the digital signature, reject any processing of the first instructions.

8. The system of claim 7 the second instructions, when executed by the processor validate the digital signature by checking whether the digital signature is recorded on a distributed ledger.

9. The system of claim 7 the second instructions, when executed by a processor:
   determine whether the digital wallet owns a non-fungible token ("NFT") minted by the private cryptographic key;

in response to determining that the digital wallet owns the NFT, linking the NFT to the dapp; and generating a visualization of the NFT.

10. The system of claim 9 wherein the generating of the visualization of the NFT comprises initiating an augmented reality view associated with a geographic location of the MRC.

11. The system of claim 7 wherein the second instructions, when executed by the processor, in response to detecting that the MRC includes the digital signature, triggers minting of a non-fungible token ("NFT").

12. The system of claim 11 wherein the second instructions, when executed by the processor, assign ownership of the NFT to the digital wallet.

* * * * *